United States Patent
Shinagawa

(10) Patent No.: US 6,181,341 B1
(45) Date of Patent: *Jan. 30, 2001

(54) POSITION INFORMATION SETTING METHOD FOR APPARATUS CONNECTED TO NETWORK

(75) Inventor: Tatsuo Shinagawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/990,920

(22) Filed: Dec. 15, 1997

(30) Foreign Application Priority Data

Dec. 17, 1996 (JP) .................................... 8-353339

(51) Int. Cl.[7] ........................................ G06F 3/14
(52) U.S. Cl. .................. 345/356; 345/349; 345/339; 345/969; 709/223; 709/224
(58) Field of Search .................... 345/349, 356, 345/969, 965, 970, 335, 339; 709/223, 224

(56) References Cited

U.S. PATENT DOCUMENTS

| | | | |
|---|---|---|---|
| 5,185,860 | * | 2/1993 | Wu .................................. 395/200.54 |
| 5,276,789 | * | 1/1994 | Besaw et al. ........................ 345/346 |
| 5,295,244 | * | 3/1994 | Dev et al. ........................... 345/349 |
| 5,572,640 | * | 11/1996 | Schettler et al. ..................... 345/440 |
| 5,689,645 | * | 11/1997 | Schettler et al. ................. 395/200.56 |
| 5,774,668 | * | 6/1998 | Choquier et al. ..................... 709/105 |
| 5,787,252 | * | 7/1998 | Schettler et al. ................. 395/200.54 |
| 5,793,974 | * | 8/1998 | Messinger ....................... 395/200.54 |
| 5,809,265 | * | 9/1998 | Blair et al. ....................... 395/200.02 |
| 5,831,618 | * | 11/1998 | Fuji et al. ............................ 345/356 |
| 5,878,420 | * | 3/1999 | Salle .................................... 709/201 |

* cited by examiner

Primary Examiner—Raymond J. Bayerl
Assistant Examiner—Thomas T. Nguyen
(74) Attorney, Agent, or Firm—Fitzpatrick, Cella, Harper & Scinto

(57) ABSTRACT

An object of the invention is to enable a user to easily grasp a physical setting position of a terminal connected through a network on a floor. In order to achieve the above object, there is provided a data processing apparatus comprises an input means for inputting layout information of an area in which the terminal connected through the network is disposed, a display means for displaying the layout information inputted by the input means, on a display, a designation means for designating the setting position of the terminal connected through the network, on the basis of the layout information displayed by the display means and a storage means for storing the setting position designated by the designation means, in correlation with discrimination information of the terminal.

19 Claims, 21 Drawing Sheets

FIG. 6

| NAME | STATE | POSITION | COORDINATES |
|---|---|---|---|
| MFP1 | READY | 2F-A | $X_4, Y_0$ |
| PC1 | READY | 2F-A | $X_2, Y_3$ |
| PRINTER1 | BUSY | 2F-B | $X_3, Y_4$ |
| SERVER | READY | 2F-A | $X_2, Y_0$ |
| ... | | | |

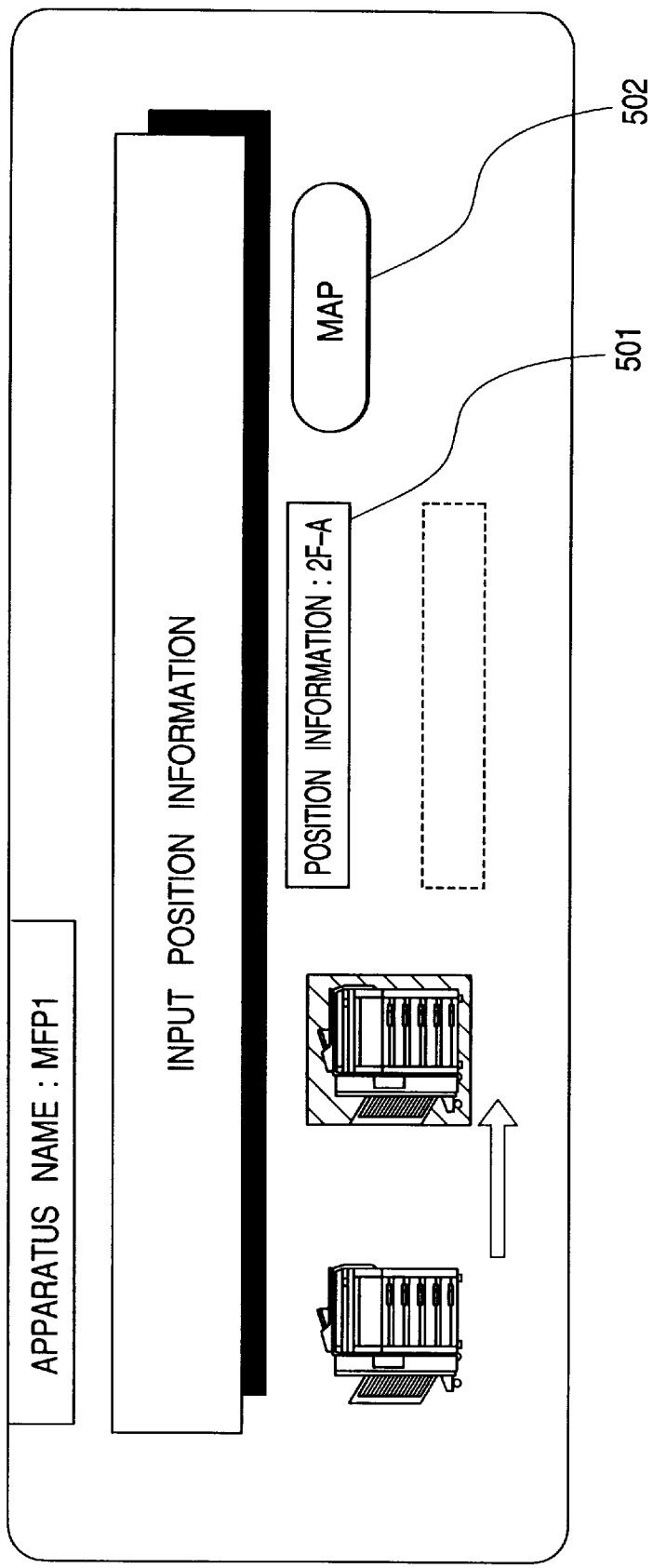

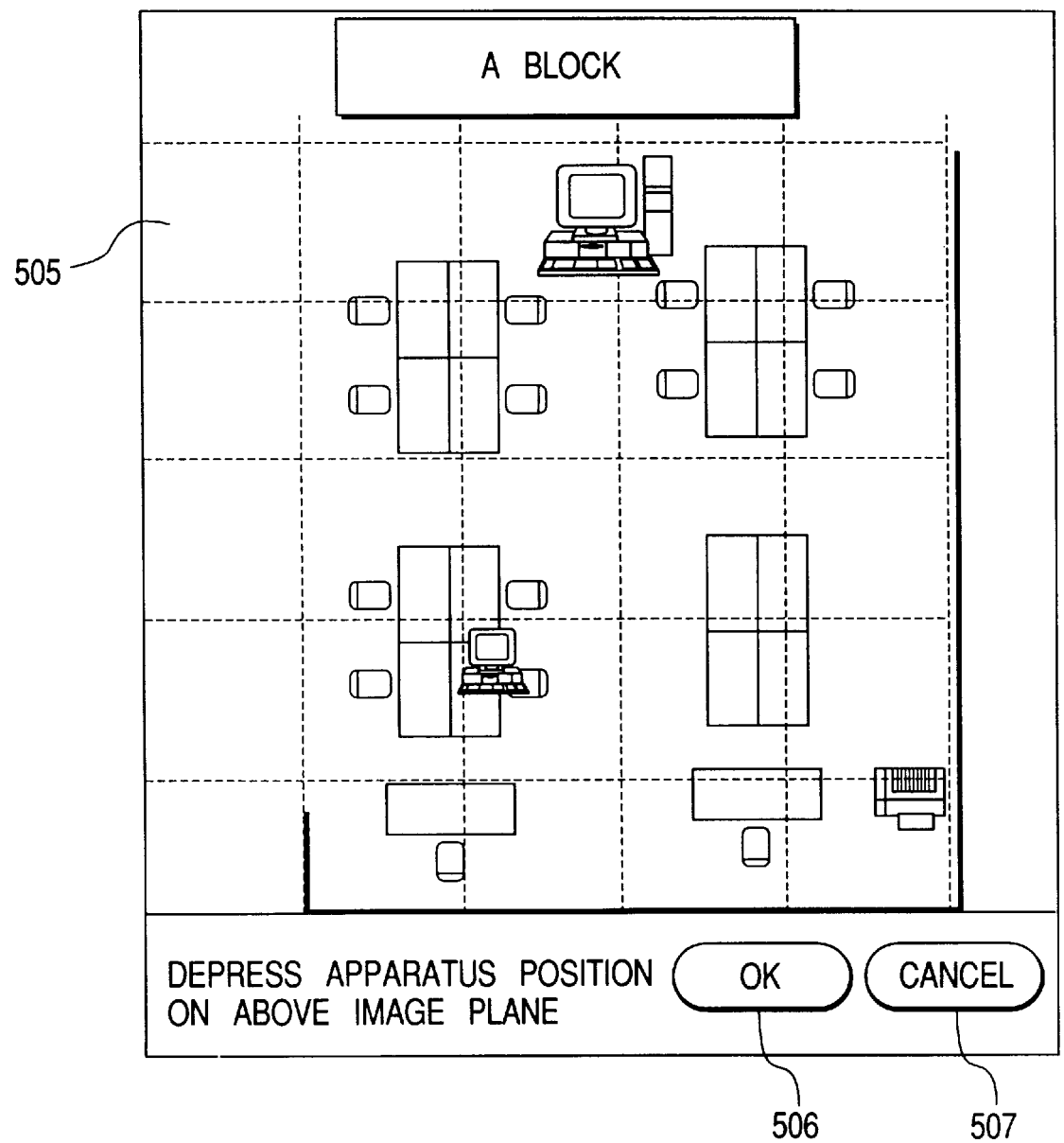

POSITION INFORMATION SETTING METHOD FOR APPARATUS CONNECTED TO NETWORK

BACKGROUND OF THE INVENTION

1. Field of the Invention

The present invention relates to a method which performs setting or the like of spatial setting positions of plural apparatus connected to others through a network or the like.

2. Related Background Art

In recent years, it has become many environments that a LAN (local area network) is constructed in wider range. That is, in the indoor environment, the network has been constructed on not only one floor but also several floors.

In such the network, plural information input/output apparatuses such as a personal computer and the like to be utilized by users are connected, and further a server machine for providing various services to these information input/output apparatuses and managing the network is connected. In addition, another plural information input/output apparatuses such as a printer apparatus, a facsimile apparatus and the like are studded.

In such the environment, when the user outputs information from the personal computer, the user captures or obtains name and state of the apparatus at an output destination from the server machine as information concerning the apparatus at such the output destination, and then outputs the information by referring to the captured information.

However, in the above-described conventional information input/output apparatus, when the user selects the apparatus at the output destination so as to output the information thereto, there is a case where the user selects the apparatus which is remarkably distant from a user's position to output the information. Further, although the user can know the information concerning the apparatus name when he selects the apparatus, such the information can not be used to set and obtain position information of apparatus which represents a physical position of the apparatus on the floor. Therefore, it has been occurred a problem that, when selecting the apparatus desired by the user, the output apparatus which is physically distant from the user is unnecessarily selected. In addition, since there are the plural apparatuses in the network, it is difficult for the user to grasp or understand the physical positions of these apparatuses. Therefore, it has been occurred a problem that, even if the information was outputted, the user is at a loss where he should go to the output destination (i.e., output apparatus) to obtain the information.

Further, when the user draws a layout or the like of the respective apparatuses onto a paper or the like to confirm the setting position of the apparatus at the output destination by checking the drawn layout against the name of such the apparatus, working to do so takes much time. Furthermore, if the layout of the apparatuses is changed, it has been occurred a problem that re-drawing of the layout takes much time.

SUMMARY OF THE INVENTION

An object of the present invention is to solve the above-described conventional problems.

An another object of the present invention is to enable a user to easily grasp or understand physical setting positions, on a floor, of plural terminals connected through a network.

A further another object of the present invention is to enable, when the terminal connected through the network was moved, such a fact to be appropriately reflected in setting position information.

A further another object of the present invention is to enable the user of the network to easily select an appropriate terminal in the network.

A further another object of the present invention is to enable the user to select an appropriate terminal correlatively with a position of the user in the network.

A further another object of the present invention is to enable the user to set the setting position information of the terminal in an interactive system.

The above and other objects, features, and advantages of the present invention will be apparent from the following detailed description and the appended claims in conjunction with the accompanying drawings.

BRIEF DESCRIPTION OF THE DRAWINGS

FIG. 6 is a view showing a management information table for the respective apparatuses;

FIGS. 8A, 8B and 8C are views respectively showing message display image planes for asking an operator;

FIG. 9 is a view showing a layout map display image plane in case of setting the position information of the apparatus;

DETAILED DESCRIPTION OF THE PREFERRED EMBODIMENT

Hereinafter, the embodiment of the present invention will be explained with reference to the accompanying drawings.

Figure 1:
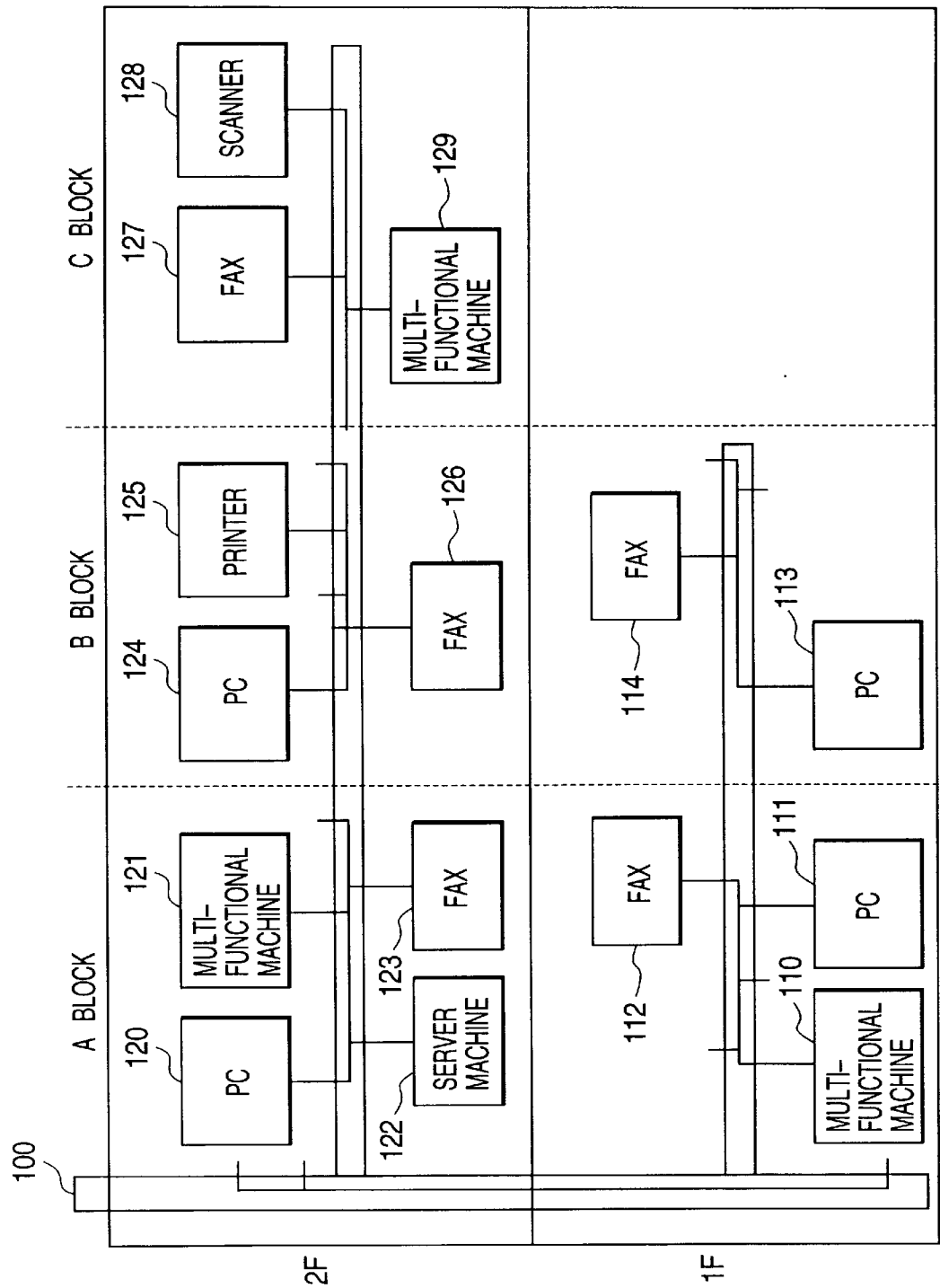
FIG. 1 is a block diagram showing schematic structure of an information input/output apparatus control system according to an embodiment of the present invention.
Figure 2A:
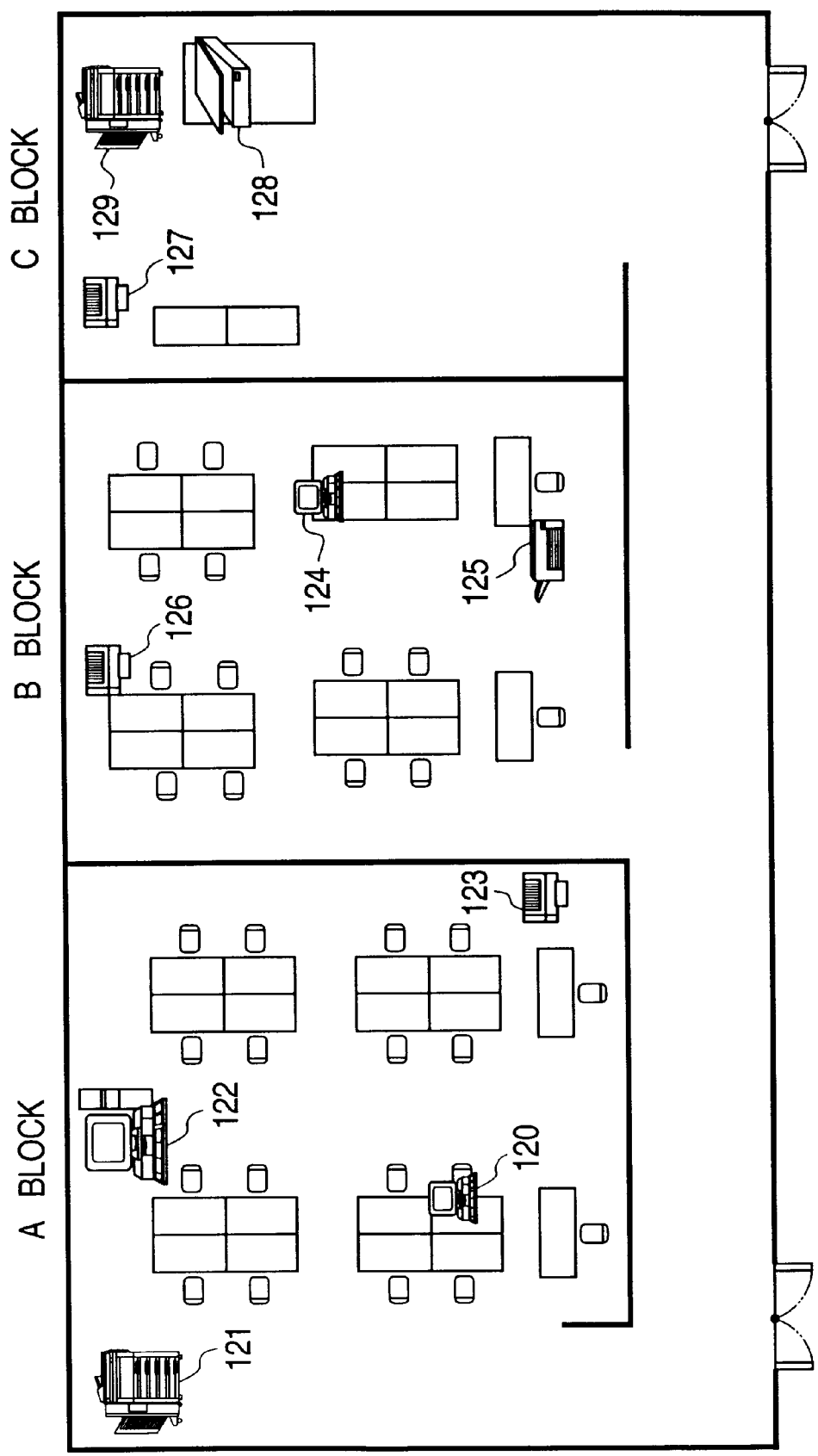
FIGS. 2A and 2B are views showing a physical layout of the apparatuses in an office.
Figure 2B:
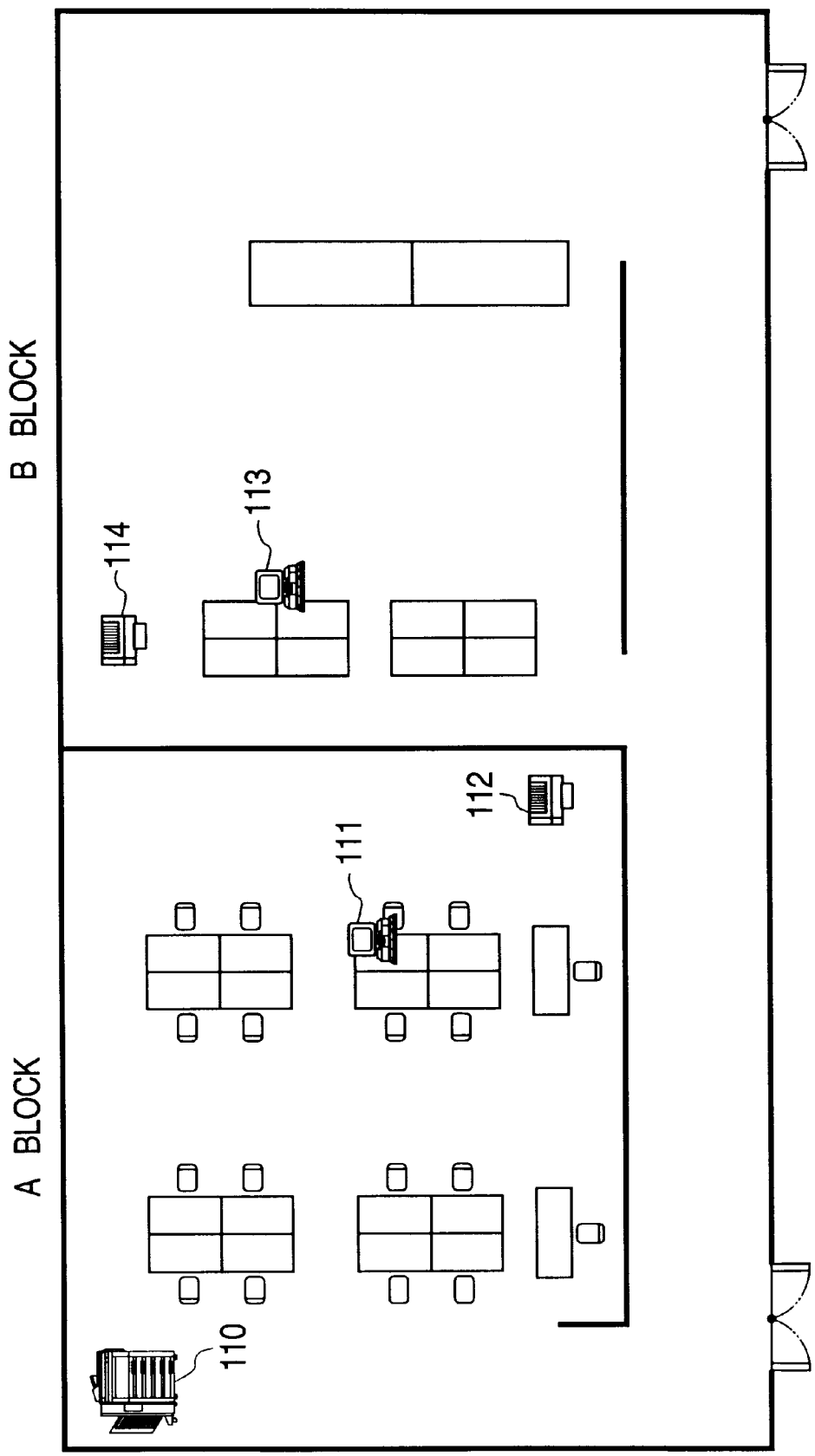

FIG. 1 is a block diagram showing schematic structure of an information input/output apparatus control system according to the embodiment of the present invention, and FIGS. 2A and 2B are views showing a physical layout of the apparatuses in an office assumed in the present embodiment. That is, FIG. 2A shows the layout on a second floor (2F), and FIG. 2B shows the layout on a first floor (1F).

FIG. 1 shows the first and second floors and their respective A, B and C blocks for convenience, i.e., the layout in FIG. 1 corresponds to those in FIGS. 2A and 2B.

As shown in FIG. 1, in the office of this example, a multi-functional machine 110, a personal computer (PC) 111 and a facsimile transmission/reception apparatus (FAX) 112 are arranged in the A block of the first floor, and a personal computer 113 and a facsimile transmission/reception apparatus (FAX) 114 are arranged in the B block of the first floor. Further, a personal computer 120, a multi-functional machine 121, a server machine 122 and a facsimile transmission/reception apparatus (FAX) 123 are arranged in the A block of the second floor, and a personal computer 124, a printer 125 and a facsimile transmission/reception apparatus (FAX) 126 are arranged in the B block of the second floor. Furthermore, a facsimile transmission/reception apparatus (FAX) 127, a scanner 128 and a multi-functional machine 129 are arranged in the C block of the second floor.

In FIG. 1, each of the multi-functional machines 110, 121 and 129 is the image input/output apparatus which corresponds to a LAN, has plural, functions such as printer, scanner and facsimile transmission/reception functions and can perform inputting/outputting of image data through the LAN. Further, each of the multi-functional machines 110, 121 and 129 has a console and display unit including an LCD (liquid crystal display) and several kinds of keys, and has casters at its leg portion for moving the machine. That is, the machine has a mechanism capable of measuring a movement distance according to rotation of the caster.

Each of the FAXs 112, 114, 123, 126 and 127 corresponds to the LAN and has a function for inputting and outputting an image through a network. The printer 125 outputs the image data, and the scanner 128 is an optical-system scanner apparatus and inputs the image data.

The server machine 122 manages the information input/output apparatuses shown in FIG. 1 and also provides various services. Especially, the server machine 122 has a function for managing a state of the connected apparatuses, and a function for managing layout drawings (i.e., maps) shown in FIGS. 2A and 2B as physical position information of the apparatuses. The server machine 122 can collect such the information in response to requests from the apparatuses or ask the apparatuses to collect such the information. Therefore, by managing the collected data, the server machine 122 provides the services in response to requirements from the personal computers 111, 113, 120 and 124. In this case, on the basis of a terminal identifier of the personal computer requested, the server machine 122 discriminates the physical setting position of such the personal computer. A user can use the other information input/output apparatus from the personal computer 111, 113, 120 and 124.

Figure 3:
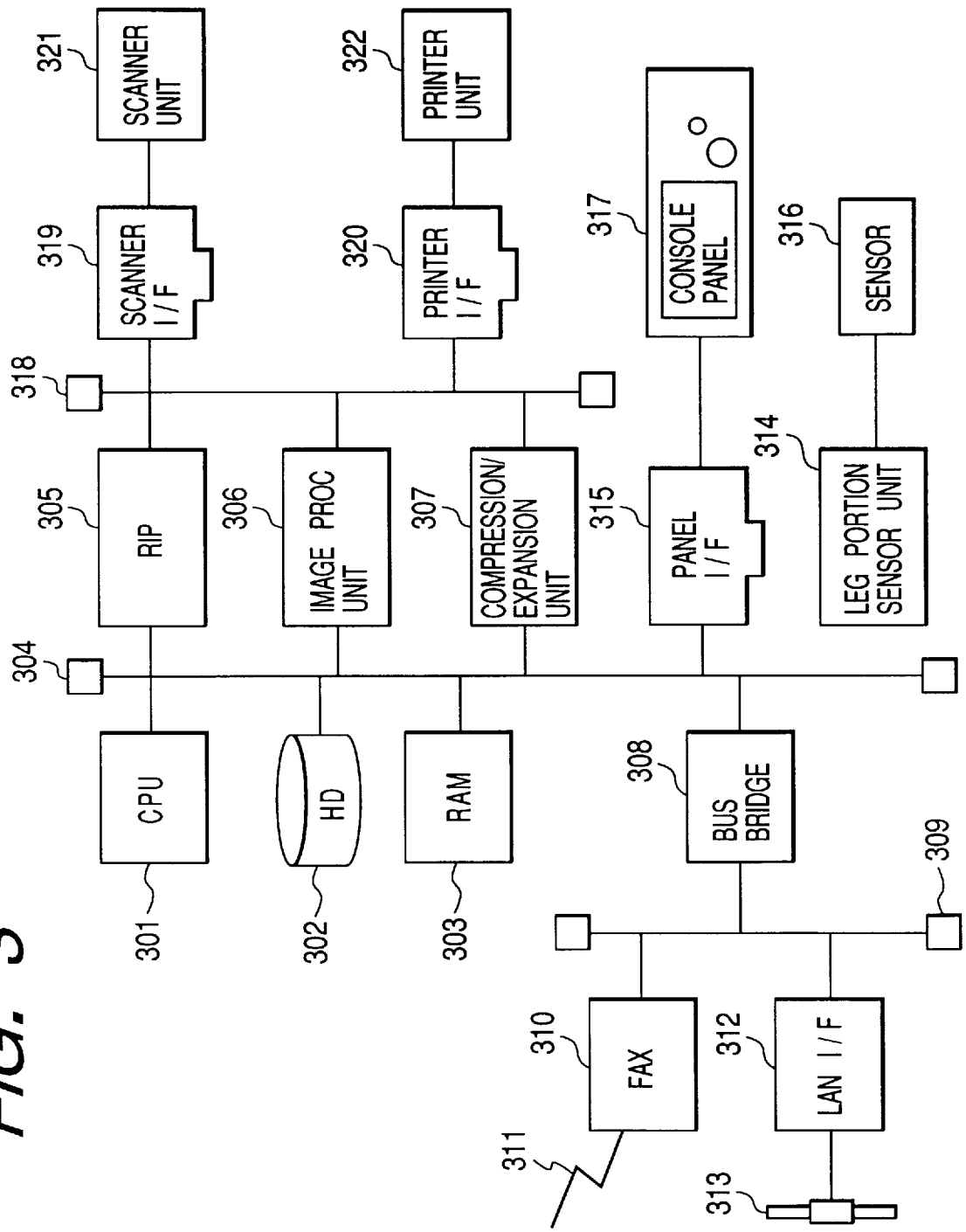
FIG. 3 is a block diagram showing schematic structure of a multi-functional machine.

Subsequently, each internal structure of the above-described multi-functional machines 110, 121 and 129 will be explained hereinafter with reference to FIG. 3.

A CPU 301 is the microprocessor which controls the multi-functional machine as a whole and operates based on a real-time OS (operating system). An HD (hard disk) 302 is the large-capacity hard disk which previously stores plural application softwares necessary in the operation of the CPU 301 and/or the image data, and operates under the control of the CPU 301. In this structure, by connecting an MO (magneto-optical) disk drive, a removable storage medium can be utilized as a storage apparatus.

A RAM 303 is the working memory which is necessary when the CPU 301 operates and is accessible from the CPU 301 at high speed. A high-speed CPU bus 304 is the bus which connects the above-described CPU 301, the HD 302 and the RAM 303 and later-described each functional unit to others. That is, the CPU bus 304 is used to transfer data processed by the CPU 301 to each functional unit, and transfer (i.e., DMA (direct memory access) transferring) the data among the respective functional units. Generally, a VL (VESA (Video Electronics Standard Association) local) bus or a PCI (peripheral component interconnected) bus can be used as the high-speed CPU bus 304.

A RIP (raster image processor) 305 is the functional unit which receives an image formation command inputted from an external interface connected to a later-described computer, and then converts the data into a bit-map image in accordance with the contents of the inputted command. The image formation command is inputted from the high-speed CPU bus 304 and used to output an image to a later-described high-speed image bus 318. There are plural kinds of the commands processed in the RIP 305 such as a PostScript, a PCL, a LIPS (LBP Image Processing System), a CaPSL (Canon Printing System Language) and the like.

An image process unit 306 is the functional unit which performs an image filtering process (e.g., smoothing process, edge process or the like) on the image inputted from the high-speed image bus 318, in accordance with process instructions by the CPU 301. In addition, the image process unit 306 has an OCR (optical character recognition) function for recognizing the image inputted from the high-speed image bus 318, and an image separation function for separating character and image portions of the inputted image from each other. A compression/expansion unit 307 is the functional unit which compresses the image inputted from the high-speed image bus 318 in an image compression method such as an MH (Modified Huffman) method, an MR (Modified READ) method, an MMR (Modified Modified READ) method, a JPEG (Join Photographic Expert Group) method or the like, and sends the compressed data to the high-speed CPU bus 304 or the high-speed image bus 318. Conversely, the unit 307 expands the compressed data inputted from such the bus 304 or 318 in accordance with the compression method of this functional unit, and sends the expanded data to the high-speed image bus 318.

A bus bridge 308 is the bus bridge controller which connects the high-speed CPU bus 304 to a later-described low-speed CPU bus 309 to absorb difference in process speed between these two buses. By providing the bus bridge 308, the CPU 301 operating at high speed can access the low-speed functional units connected to the low-speed CPU bus 309.

The low-speed CPU bus 309 has bus structure of which transfer speed is lower than that of the high-speed CPU bus 304 and is used to connect the functional unit of which process capability is relatively low. A facsimile transmission/reception apparatus (FAX) 310 is the functional unit provided between a public line 311 and the low-speed CPU bus 309. The FAX 310 has a function to modulate digital data sent from the low-speed CPU bus 309 such that the modulated data can be flowed in the public line 311, and a function to convert modulated data sent from the public line 311 into the digital data capable of being processed in the multi-functional machine.

A LAN interface 312 is the functional unit which connects the multi-functional machine to a LAN 313 and is used to transmit and receive the data to and from the LAN 313. Generally, an Ethernet or the like is used. A panel interface 315 sends and receives various control signals to and from a console panel 317 in the multi-functional machine. That is, the panel interface 315 is the unit which sends the signal from an input switch such as a later-described key or the like provided on the panel 317, and performs resolution converting on the image data generated by the RIP 305, the image process unit 306 and the compression/expansion unit 307 such that the converted data can be displayed on a liquid crystal display unit on the console panel 317.

The high-speed image bus 318 is the bus which connects the image input/output bus in each of various image generation units (i.e., RIP 305, image process unit 306 and compression/expansion unit 307) to later-described scanner interface 319 and printer interface 320. Controlling of the bus 318 is not performed by the CPU 301, but is performed by a bus controller to perform data transferring.

A scanner unit 321 is the visible image reading apparatus which comprises an automatic original feeder (corresponding to two sides of original). The scanner unit 321 has a three-line (R (red), G (green) and B (blue)) CCD color sensor or a one-line (black and white) CCD line sensor. The image data which was read by the scanner unit 321 is transferred to the high-speed image bus 318 by the scanner interface 319. The scanner interface 319 has a function to perform optimal binarizing on the image data read by the scanner unit 321 in accordance with contents of succeeding processes, a function to perform serial-to-parallel converting according to a data width of the high-speed image bus 318, and a function to convert read R, G and B three primary color data into C (cyan), M (magenta), Y (yellow) and Bk (black) data.

A printer unit 322 prints the image data received from the later-described printer interface 320 on a recording paper as visible image data. As the printer unit 322, a bubble-jet printer which prints the image on the recording paper by using a bubble jet system, or a laser beam printer which utilizes an electrophotographic technique to generate the image on a photosensitive drum by utilizing laser beam and then form the generated image on the recording paper can be used. Further, as the laser beam printer, a monochrome laser beam printer or a color laser beam printer (Y, M, C and Bk) can be used.

The printer interface 320 transfers the image data sent from the high-speed image bus 318 to the printer unit 322. The printer interface 320 has a bus-width conversion function to convert a bus width of the high-speed image bus 318 into a bus width corresponding to gradation of the printer from which the data outputting is intended, and a function to absorb difference between printing speed of the printer and image data transferring speed of the high-speed image bus 318.

The console panel 317 has the liquid crystal display unit, a touch panel input device adhered onto the liquid crystal display unit, and plural hard keys. The signal which was inputted by the touch panel input device or the hard key is sent to the CPU 310 through the above-described panel interface 315, and the liquid crystal display unit displays the image data sent from the panel interface 315. That is, the liquid crystal display unit displays the functions in the operation of the multi-functional machine, the image data and the like.

A leg portion sensor unit 314 controls a sensor 316 attached to the leg portion of the multi-functional machine, and is the unit which judges whether or not the machine was moved and stores physical position information of the machine when the machine was moved.

Figure 4:
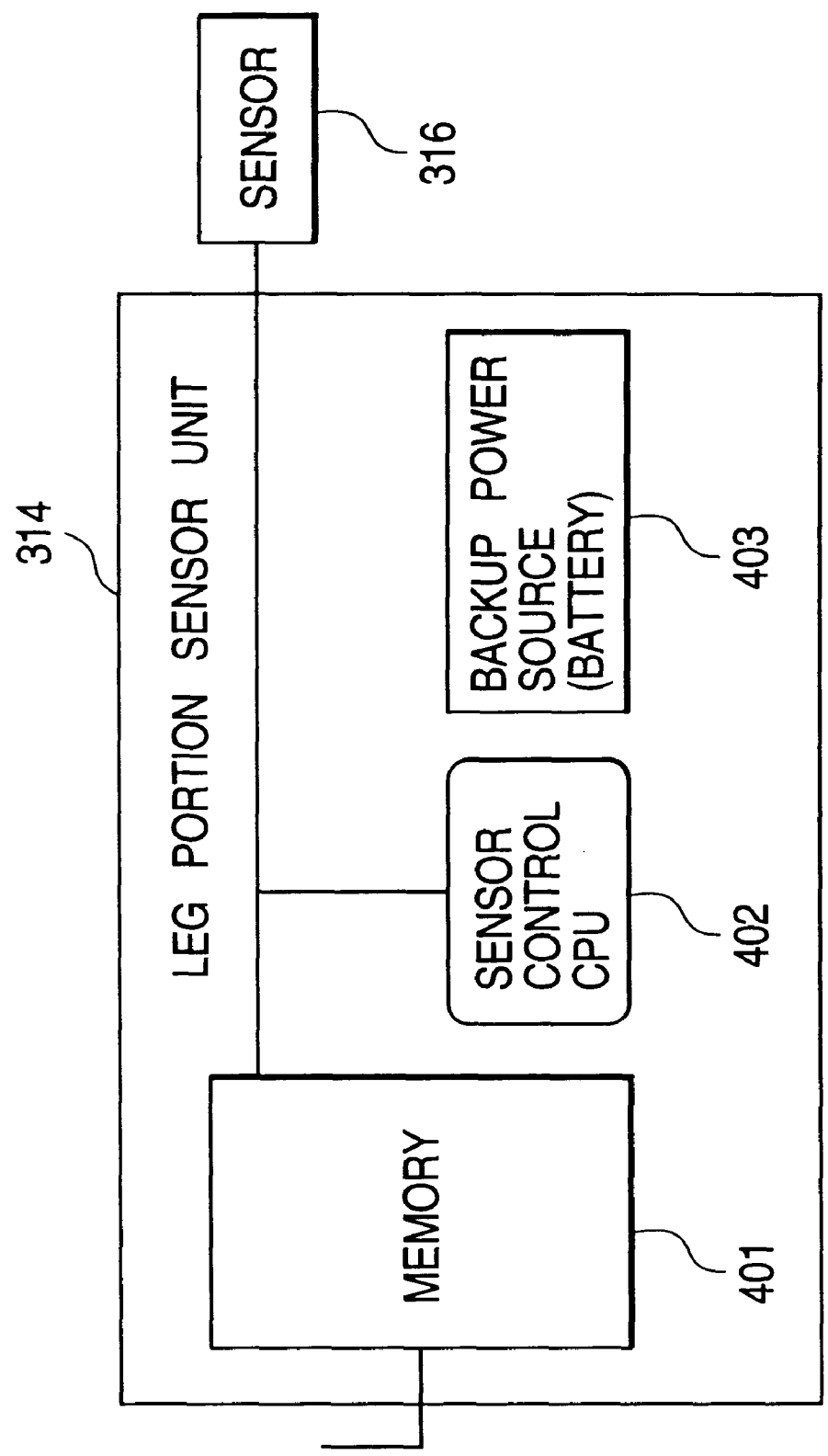
FIG. 4 is a block diagram showing structure of a leg portion sensor unit 314.

Structure of the leg portion sensor unit 314 will be explained hereinafter with reference to FIG. 4.

A sensor control CPU 402 controls the sensor 316 of the leg portion. A memory 401 utilizing a semiconductor memory is the memory which is used in common with the CPU 301 of the multi-functional machine. In the memory 401, the physical position information, a part of layout drawing (shown in FIG. 5) corresponding to the block in which the machine is positioned (i.e., range corresponding to A block in this case), and position coordinates of the apparatuses on the layout drawing have been stored. The memory 401 holds the stored information even if power is not supplied. Further, a backup power source 403 is the charge-type battery which operates the leg portion sensor unit 314 even if power failure of the entire multi-functional machine occurs.

Subsequently, operations (A), (B), (C) and (D) in the present embodiment will be explained hereinafter.

(A) Setting in Server

Initially, to form the layout drawings (FIGS. 2A and 2B) will be explained. In a case where a drawing (figure) of the range to which the LAN is applied has been drawn on a paper (although not limited to paper), such the drawing is read by the scanner of the multi-functional machine and its image data is sent to the server machine 122. However, such the image data may be generated in the server machine 122 itself. In this case, the server machine 122 contains the two image data respectively corresponding to the first and second floors. In the server machine 122, the image data is divided into the large A, B and C blocks, and each of the divided A, B and C blocks is further divided to make the coordinates thereof. It should be noted that this layout drawing can be displayed with appropriate enlarging, reducing, scrolling or the like.

Figure 5:
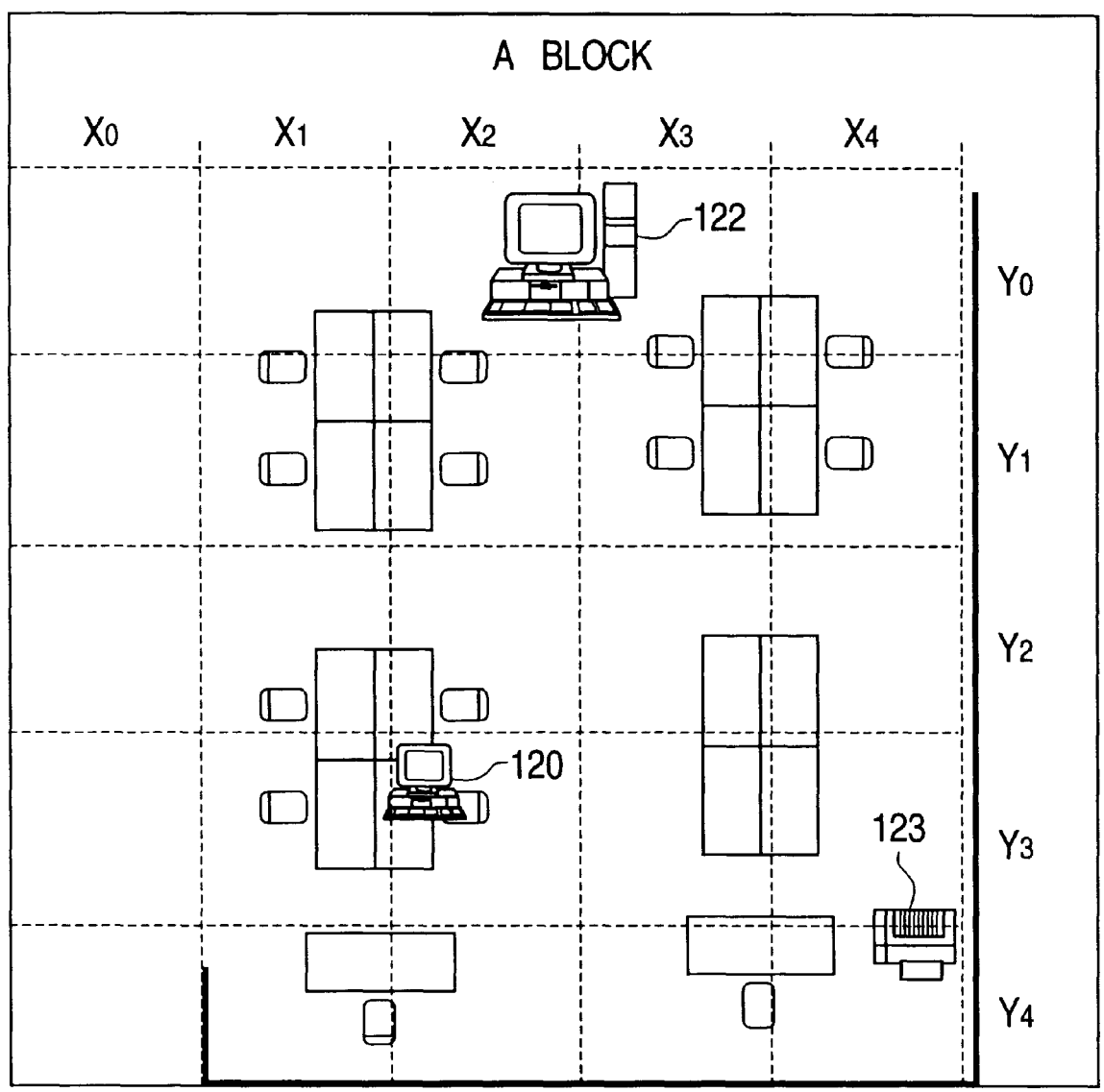
FIG. 5 is a view showing a part of layout map which is held in the leg portion sensor unit.

In such the case as shown in FIG. 5, the A block is divided into five sections respectively in longitudinal and lateral directions, to make longitudinal coordinates $Y_0, Y_1, Y_2, Y_3$ and $Y_4$ and lateral coordinates $X_0, Y_1, X_2, X_3$ and $X_4$. Similarly, the coordinates are made in the other blocks. In consideration of the block range and the machine size, a manager may appropriately determine a dividing method and the number of dividing by using a software tool in the server machine 122.

Then, an information table as shown in FIG. 6 is formed to correlate the drawing data with the information which is notified from each apparatus in the LAN and obtained by requesting from the server machine 122 to each apparatus.

(B) Initial Setting in Multi-Functional Machine

Figure 7:
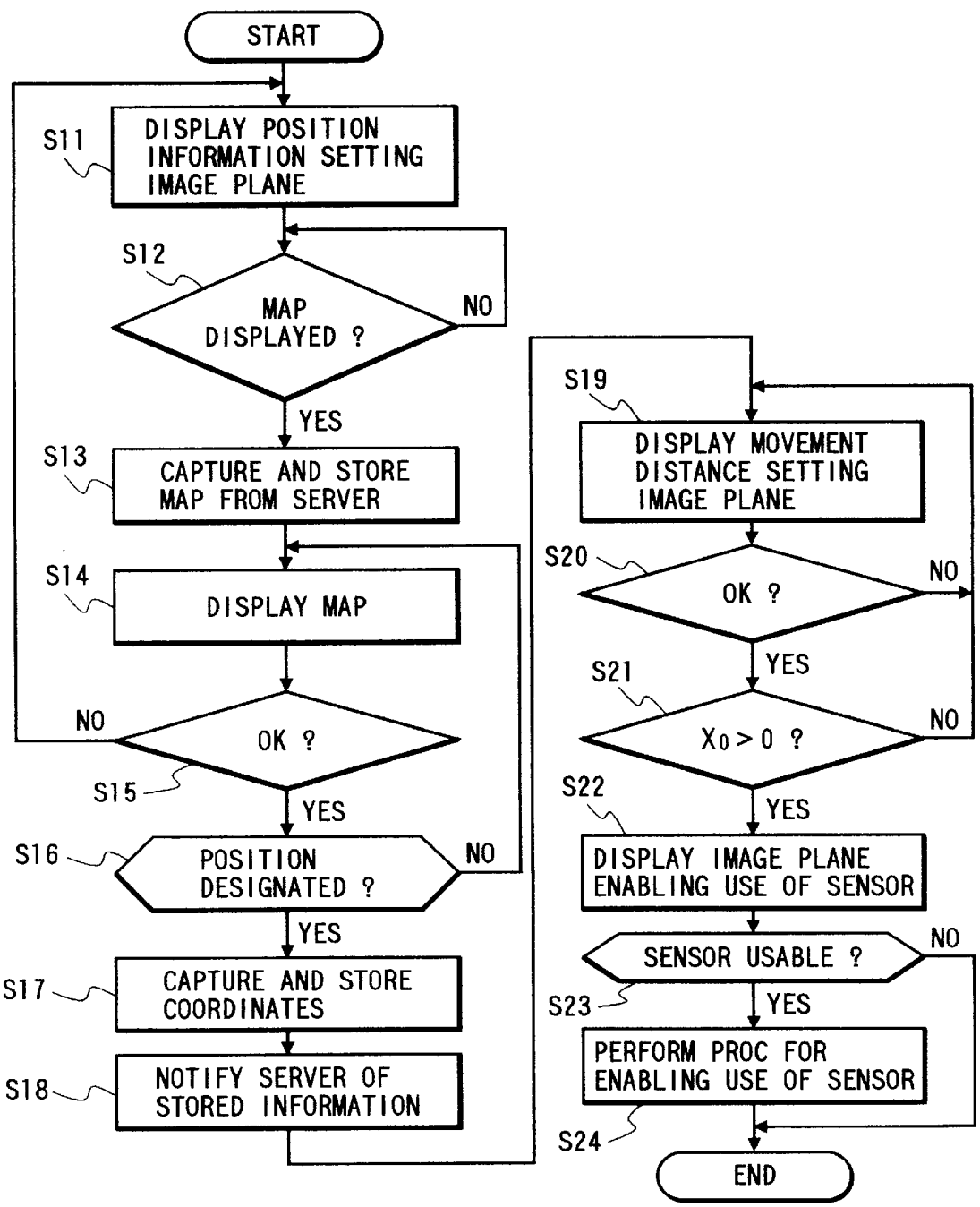
FIG. 7 is a flow chart of initial setting of position information.

It will be explained hereinafter a case where the initial setting of the apparatus position information is performed by using the console panel of the multi-functional machine 121 (named MFP1) in the A block, with reference to a flow chart shown in FIG. 7 and message display image planes shown in FIGS. 8A to 8C. It is assumed that a program corresponding to the initial setting flow chart shown in FIG. 7 has been previously stored in the HD 302. Thus, the CPU 301 performs the operation controlling on the basis of the stored program.

Also, it is assumed that the multi-functional machine 121 has been already connected to the network, and the apparatus name and the like have been already registered in the server machine 122. In case of setting the position information, the image plane shown in FIG. 8A is displayed on the console panel (step S11). Then, when position information "2F-A" is inputted, a button "MAP" (502 in FIG. 8A) is enabled to be depressed.

Subsequently, when the button "MAP" (502 in FIG. 8A) is depressed (step S12), the inputted apparatus name and position information are sent to the server machine 122 and a layout drawing (FIG. 9) of its block is requested also to the machine 122, in response to the depression. After its layout drawing information is obtained, the obtained information is stored in the memory (step S13). Then, after the block layout drawing previously stored in the server machine 122 is transferred therefrom in such a manner as described above, the transferred drawing is displayed on the panel as shown in FIG. 9 (step S14). This block layout drawing displayed according to the inputted position information is corresponding to the A block of the second floor.

If the multi-functional machine 121 is being arranged on the floor displayed by a layout drawing 505 in FIG. 9, the physical position of this machine is indicated or designated in the drawing on the panel and subsequently a button "OK" (506 in FIG. 9) is depressed (step S15), to confirm whether or not the position of the machine has been designated (step S16). If designated, its coordinates are obtained and stored (step S17), the stored information is sent to the server machine 122 (step S18), and then the displaying of the layout drawing is closed and instead the image plane shown in FIG. 8B is displayed (step S19). Even in this case, when a button "CANCEL" (507 in FIG. 9) is depressed, the image plane returns to that shown in FIG. 8A.

Figure 8B:
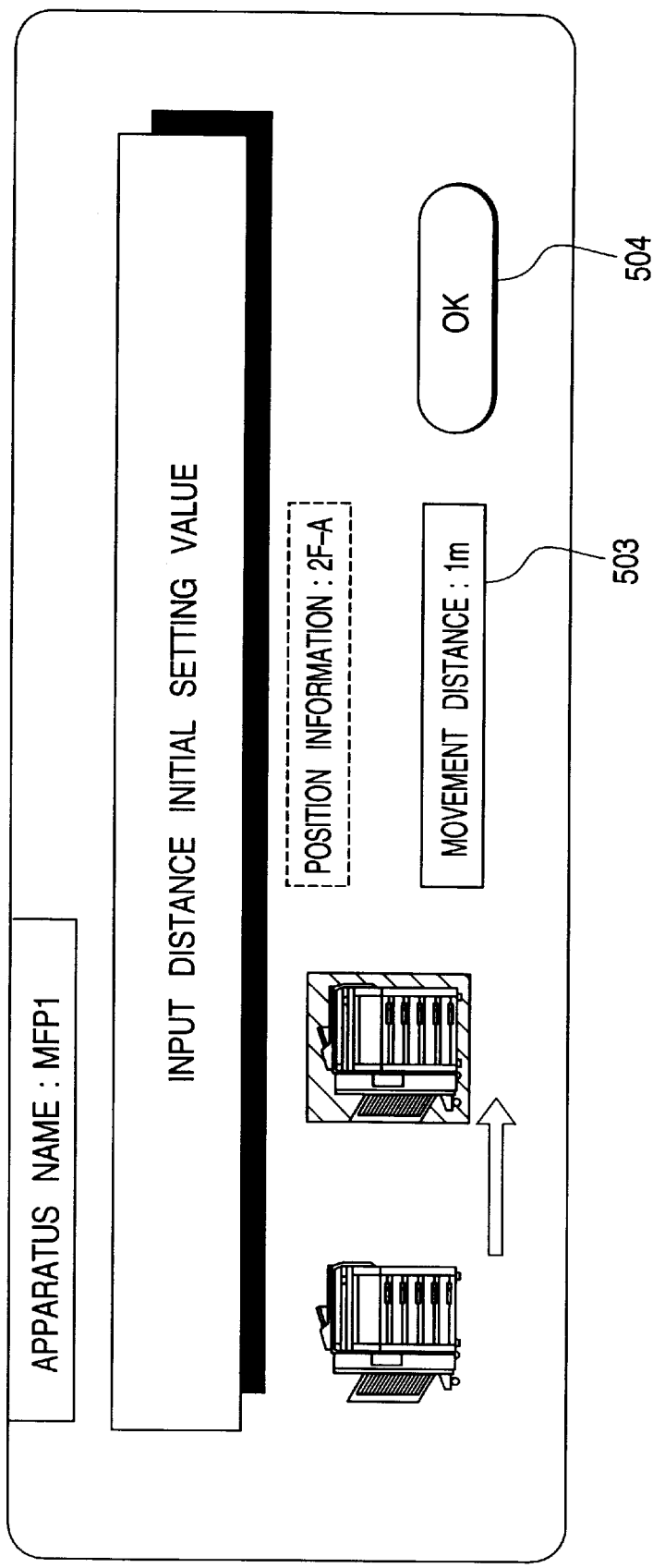
Figure 8C:
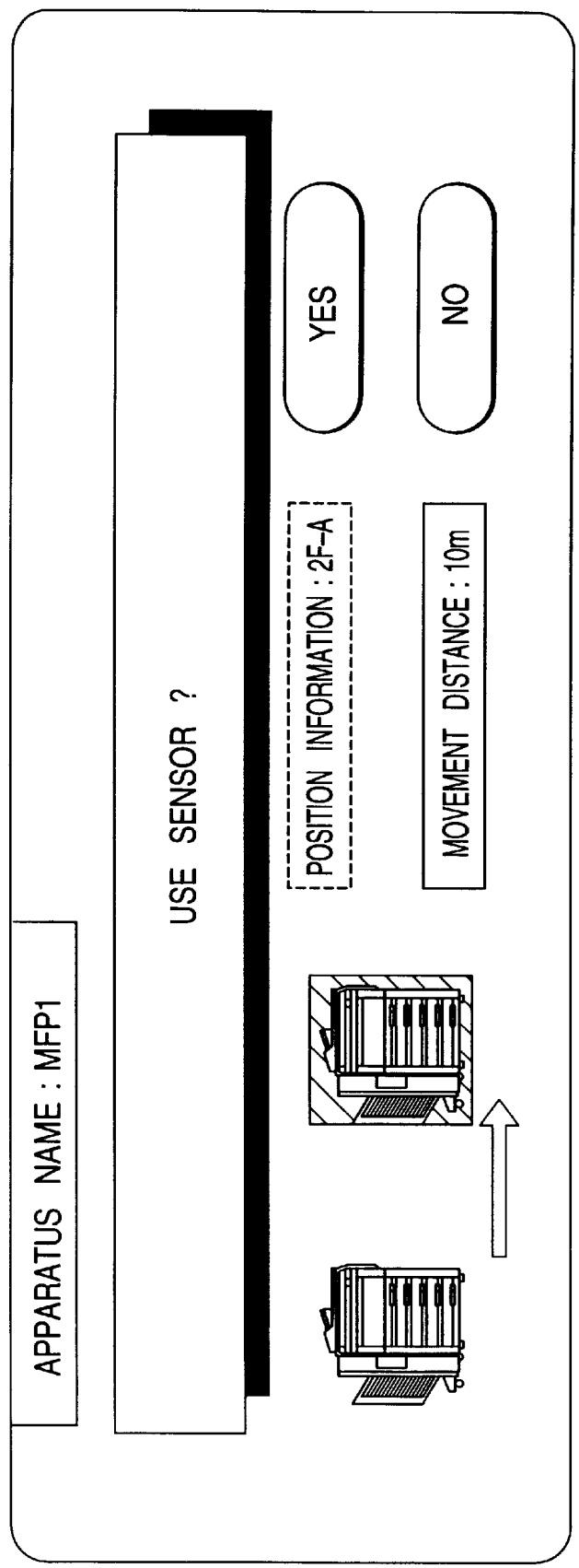

The image plane shown in FIG. 8B is used to input distance information for judging whether or not the machine was moved. When a distance initial setting value, i.e., the distance information is inputted (503 in FIG. 8B) and a button "OK" (504 in FIG. 8B) is depressed (step S20), it is judged whether or not the inputted value is normal (step S21) and then the inputted value is stored in the memory.

Subsequently, it is displayed the image plane shown in FIG. 8C for asking an operator whether or not it enables the sensor 316 to be used (step S22). In response to the response for such asking, it is judged whether or not the sensor 316 is to be used (step S23), and a judged state is also stored in the memory (step S24). At this time, the server machine 122 transmits the requested block layout drawing to the machine, and receives the coordinates of the machine in the block layout drawing. Then, the coordinates are registered in the information table (FIG. 6) of the apparatus.

(C) Moving of Multi-Functional Machine

Subsequently, it will be explained hereinafter the operation in a case where the multi-functional machine 121 is moved, with reference to a flow chart shown in FIG. 10. It is assumed that a control program corresponding to the control flow chart shown in FIG. 10 has been previously stored in the memory 401 shown in FIG. 4. Thus, the sensor control CPU 402 performs the operation controlling on the basis of the stored control program.

For example, it will be explained a case shown in FIG. 11 where the multi-functional machine 121 is moved from a position 601 to a position 602 in the A block. When the machine is moved, generally, a main power source is temporarily turned off and the machine to be moved is disconnected from the network. When the machine 121 starts moving, the leg portion sensor unit 314 starts operating by means of the backup power source (i.e., charging battery) 403 to measure a moved distance.

Figure 10:
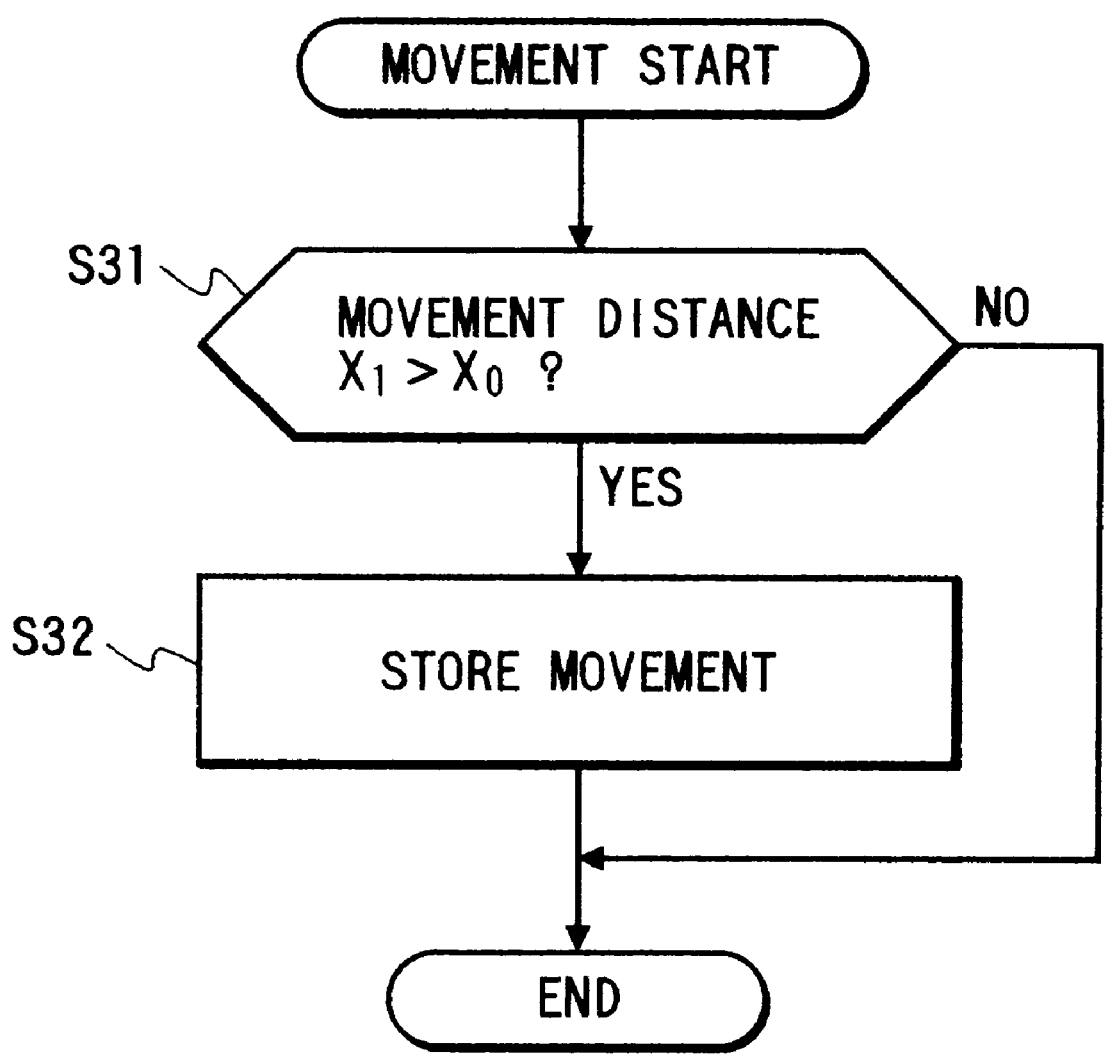
FIG. 10 is a control flow chart in case of moving a setting position of the apparatus.

In the operation shown by the flow chart of FIG. 10, when the leg portion sensor 314 starts operating and then the moved distance measured by the sensor 314 exceeds a distance $X_0$ which was set at the time of initial setting (step S31), the fact that the multi-functional machine 121 was moved is stored in the memory 401 (step S32). The operation up to this is performed by the sensor control CPU 402 of the leg portion sensor unit 314.

Figure 12:
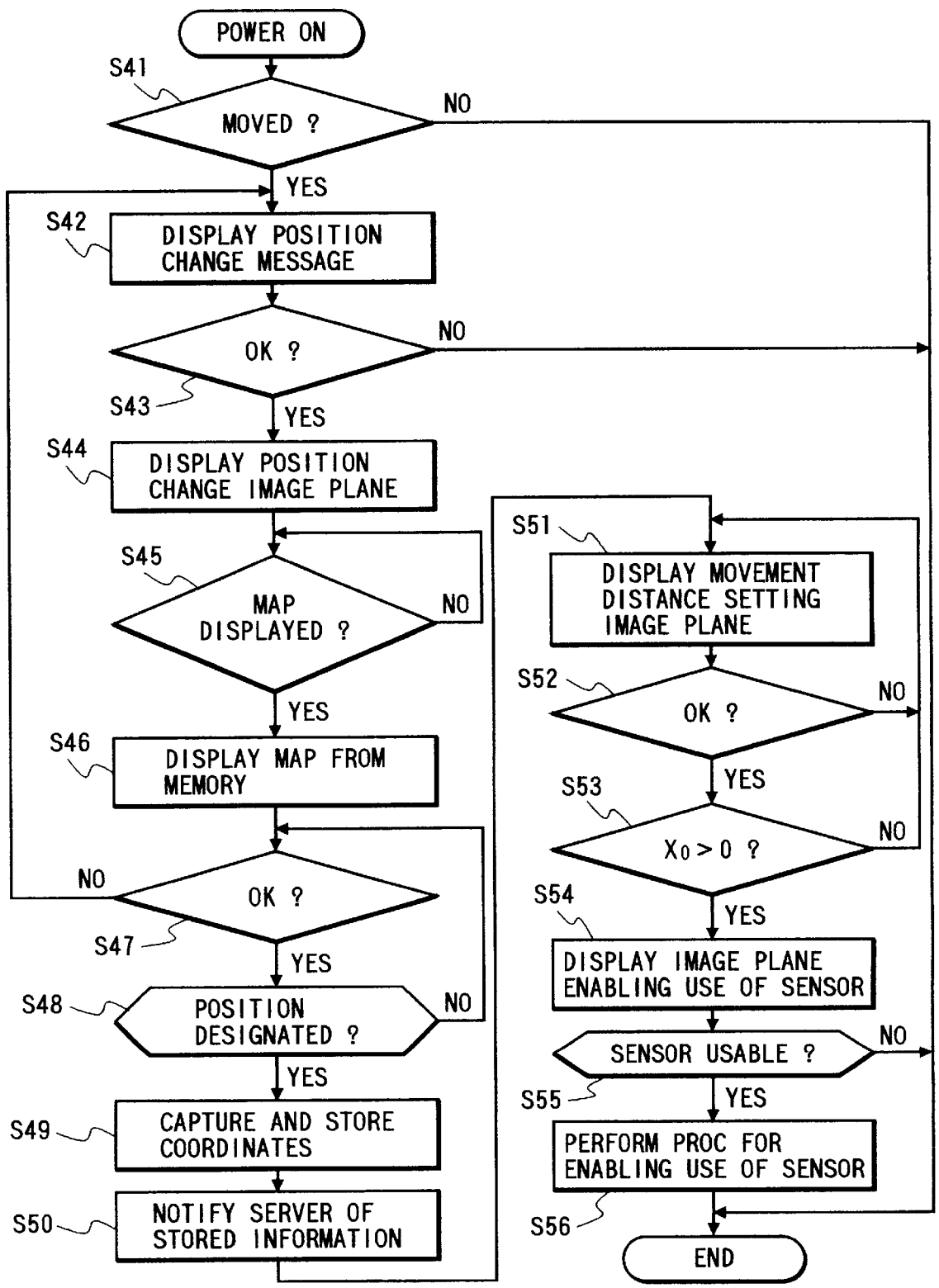
FIG. 12 is a control flow chart showing a process after the apparatus was moved.

Subsequently, it will be explained the operation at the time when the main power source is turned on and then the multi-functional machine 121 starts operating after the moving of the machine 121 is completed, with reference to a flow chart shown in FIG. 12 and display image planes shown in FIGS. 13A and 13B. In this case, it is assumed that a control program corresponding to the control flow chart after the machine moving shown in FIG. 12 has been previously stored in the HD 302. Thus, the CPU 301 performs the operation controlling on the basis of the stored control program.

When the power source is turned on, "information representing whether or not the multi-functional machine 121 was moved" stored in the memory 401 of the leg portion sensor unit 314 is read to judge whether or not the machine 121 was moved (step S41). If not moved, ordinary initializing is performed.

Figure 13A:
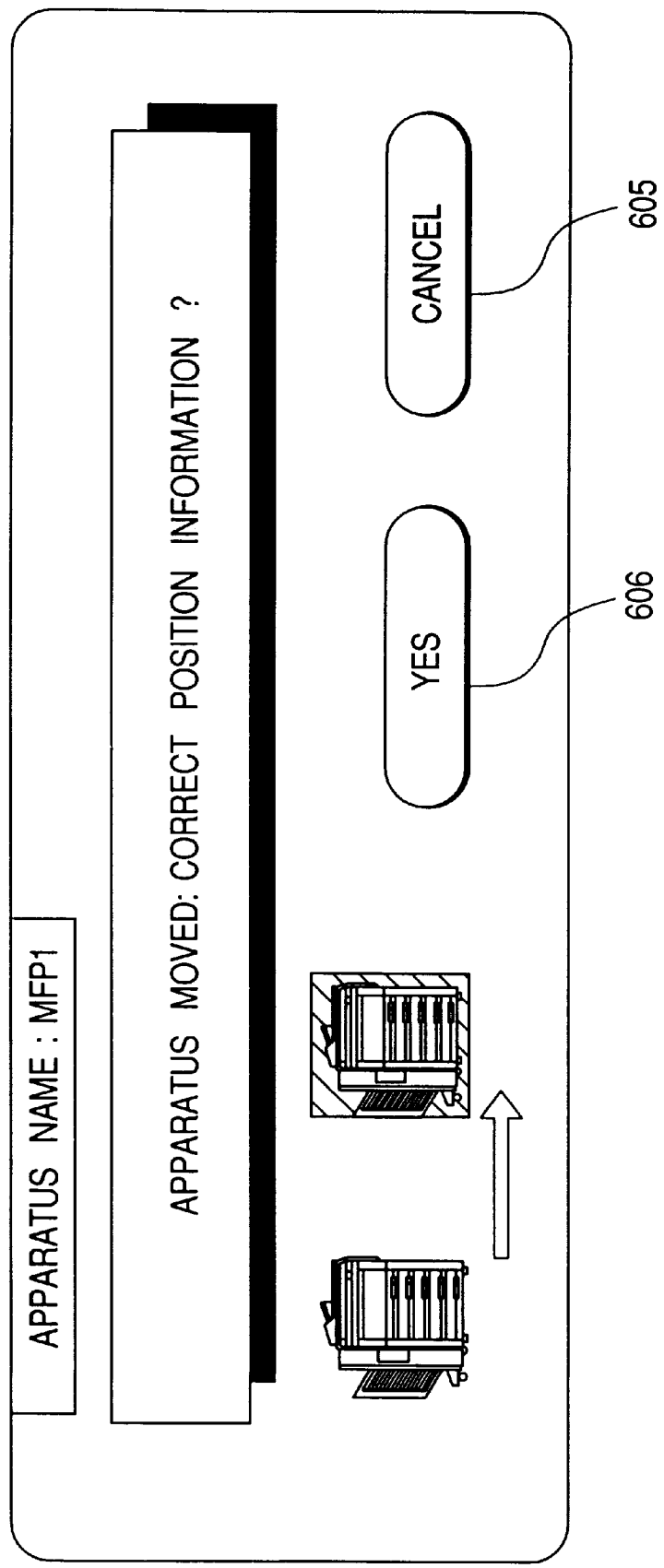
FIGS. 13A and 13B are views showing message display image planes used in case of changing the position information.
Figure 13B:
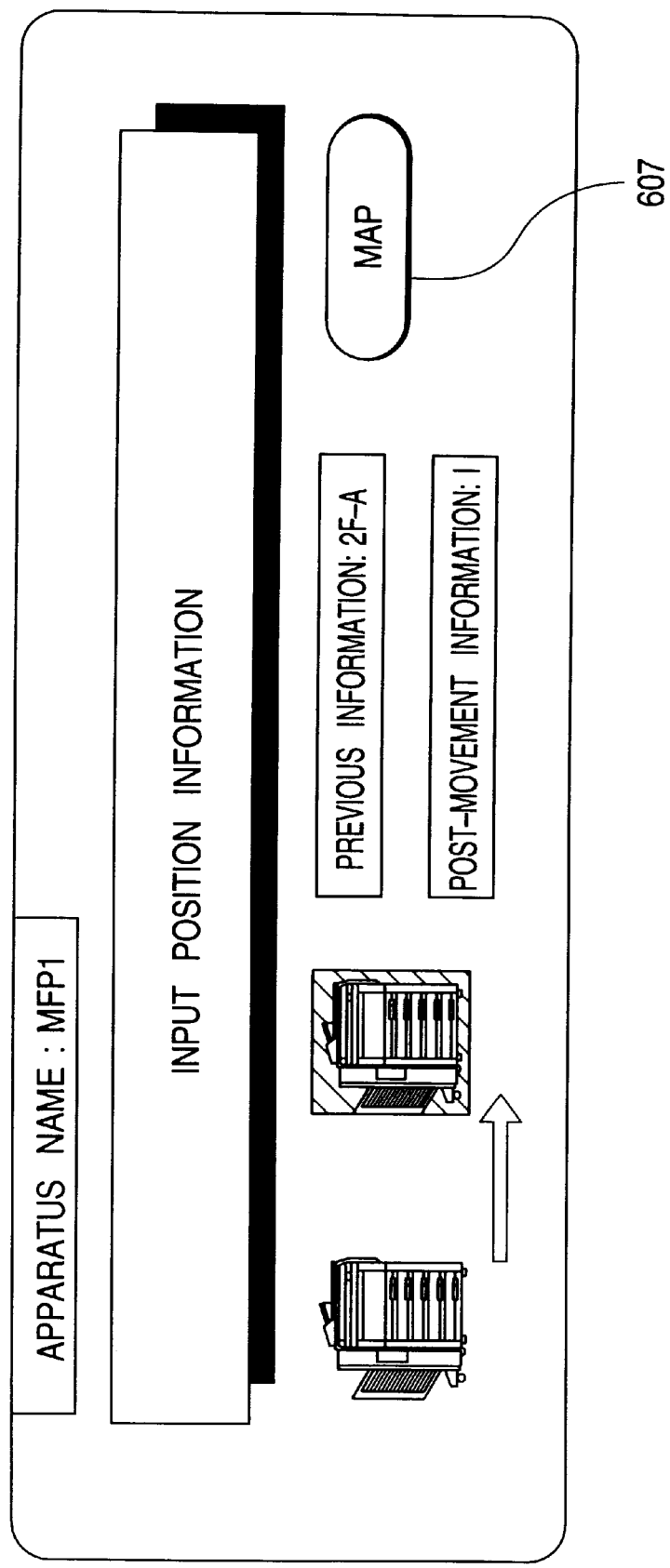

On the other hand, if moved, a position information change message shown in FIG. 13A is displayed (step S42). If the position information is not changed, a button "CANCEL" 605 is depressed to terminate the process. In this case, any changing is not at all performed. When a button "YES" 606 is depressed (step S43), a position information change image plane shown in FIG. 13B is displayed (step S44). Then, when the position information is inputted, such information is newly registered (i.e., rewritten) in the memory.

When a button "MAP" 607 is depressed (step S45), the layout drawing (MAP) is read from the memory and then displayed (step S46).

Figure 11:
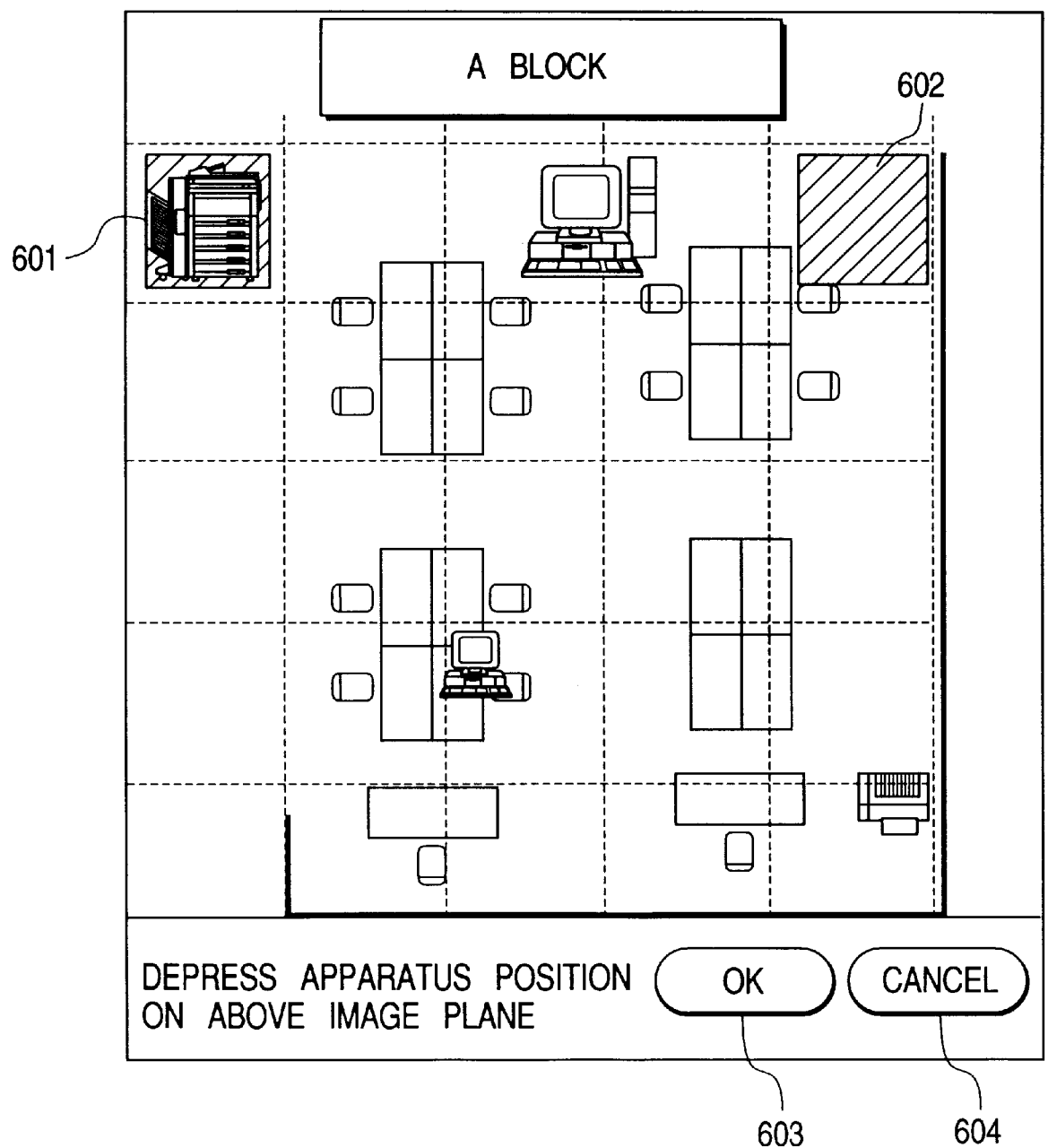
FIG. 11 is a view showing a layout map display image plane in case of resetting the position information of the apparatus.

When the new position 602 is indicated on the layout drawing (MAP) shown in FIG. 11 and a button "OK" 603 is succeedingly depressed (step S47), it is confirmed whether or not the position has been indicated (step S48). If indicated, its coordinates are obtained and stored (step S49), the stored information is sent to the server machine 122 (step S50), the layout drawing is closed, and then the image plane shown in FIG. 8B is displayed (step S51).

Then, when a button "CANCEL" 604 shown in FIG. 11 is depressed, the image plane returns to that shown in FIG. 13A. As explained above, the image plane shown in FIG. 8B is the image plane for inputting the distance information to judge "whether or not the multi-function machine 21 was moved". In the image plane shown in FIG. 8B, when the distance initial setting value is inputted (503) and the button "OK" 504 is depressed (step S52), it is judged whether or not the inputted value is normal (step S53), and then the inputted value is stored in the memory.

Subsequently, the image plane (FIG. 8C) for asking whether or not it enables the sensor to be used is displayed (step S54), it is judged responsive to the answer whether or not the sensor 316 is to be used (step S55), and then such a state is also stored in the memory (step S56).

The server machine 122 receives such notification in the step S50 and thus updates the apparatus information table shown in FIG. 6.

(D) Selection of Apparatus

Figure 14:
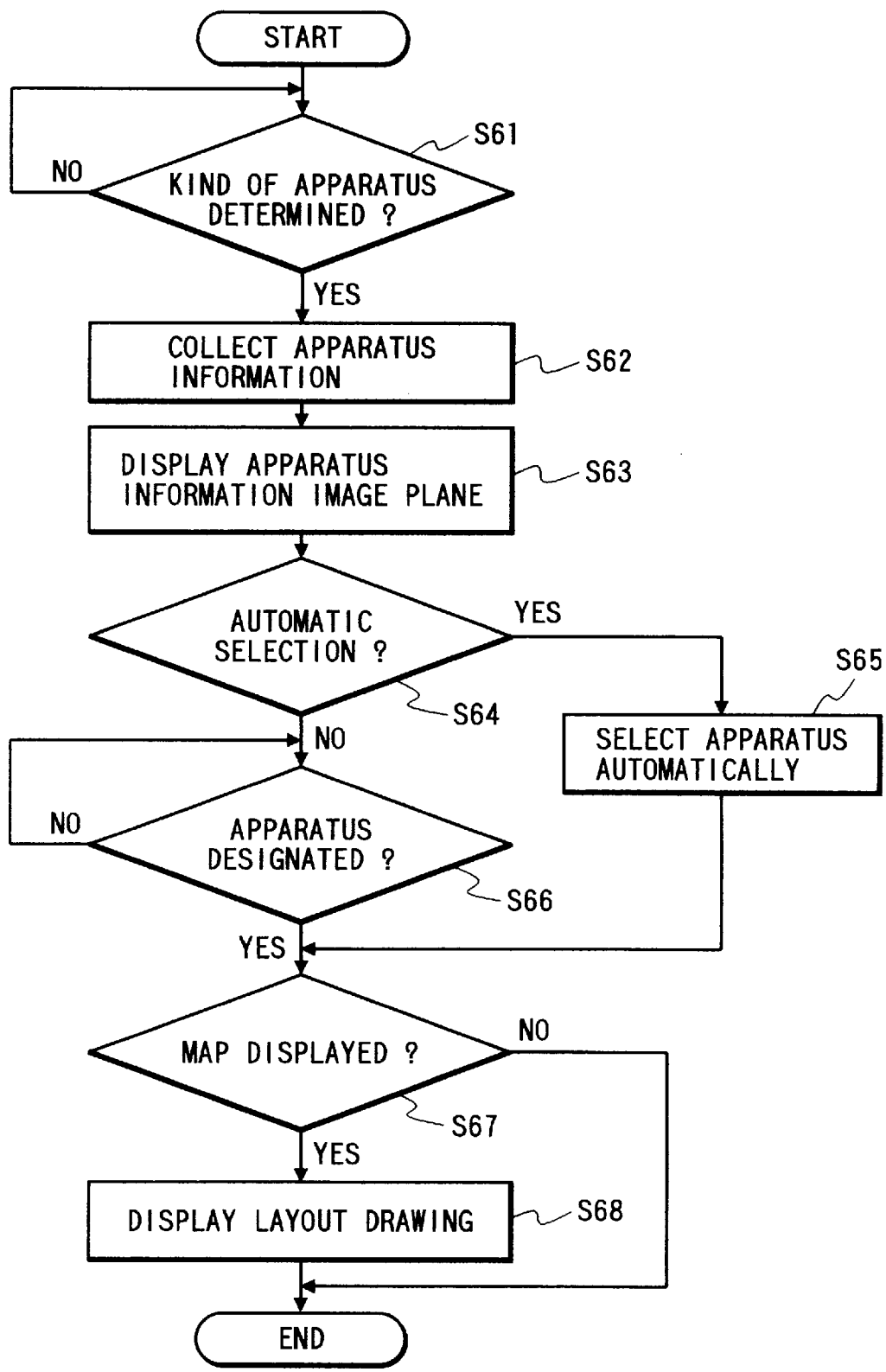
FIG. 14 is a flow chart in a case where a user selects the apparatus from a personal computer.

Subsequently, it will be explained a case where the apparatus is used by the user with the personal computer 120 in the A block, with reference to a flow chart shown in FIG. 14. In this case, it is assumed that a control program corresponding to the apparatus selection flow chart shown in FIG. 14 has been previously stored in the hard disk or the like of the computer 120 which stores the control programs. Thus, the operation is controlled based on an MPU of the personal computer 120.

Like the multi-functional machine 121, it is also assumed that the personal computer 120 contains the program to register the physical position information in the server machine 122, and the position information has been already registered in the server machine 122.

Figure 15A:
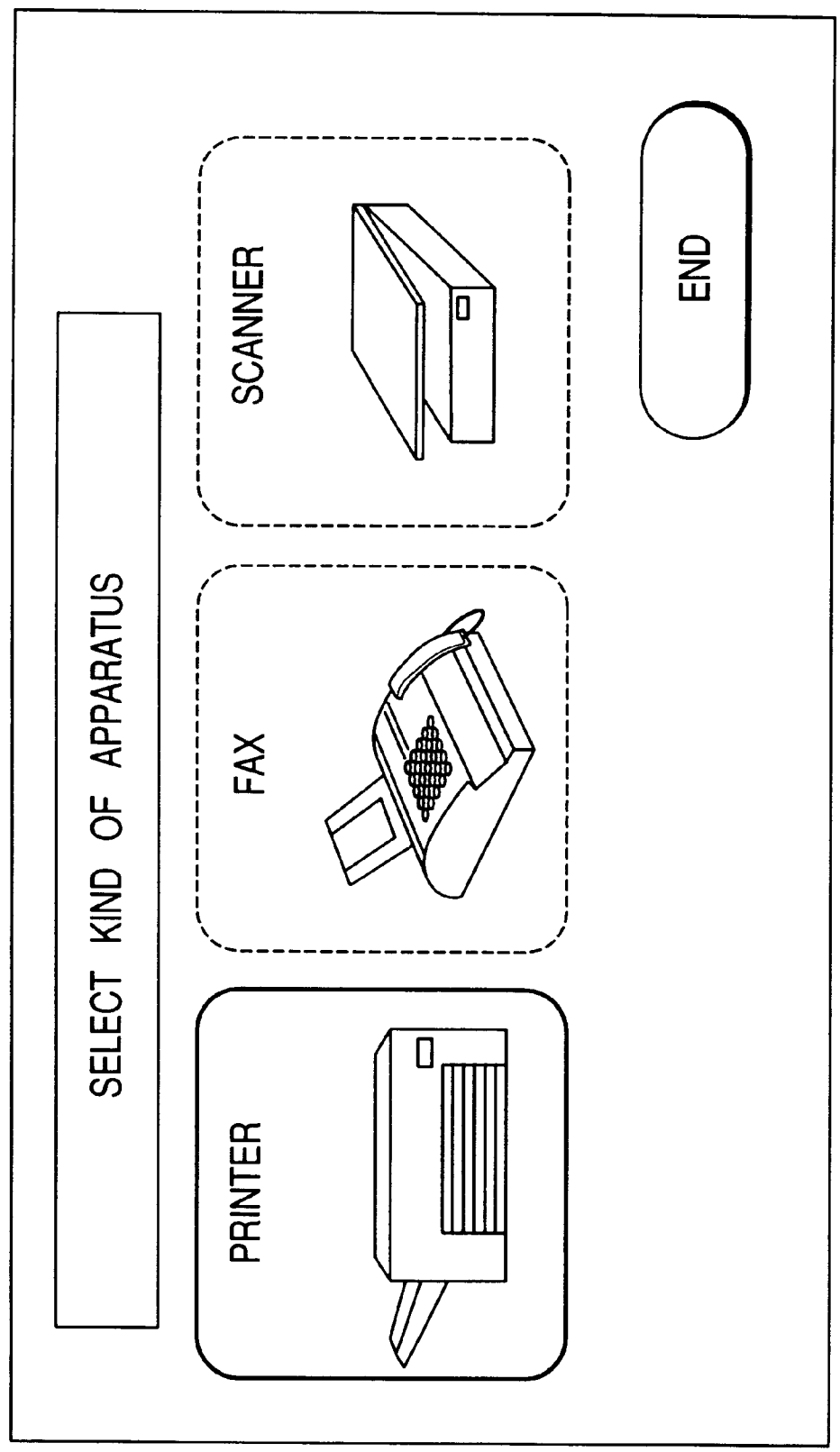
FIGS. 15A and 15B are views showing message display image planes for apparatus selection displayed on the personal computer.

FIG. 15A shows an image plane which is displayed by initiating a utility software held in the personal computer 120 and is used to select a kind of the apparatus to be used. That is, when the utility software is initiated, the kind of the apparats is selected. Then, when the kind is selected (step S61), information as to the indicated or designated apparatus is collected (step S62). The collected information, and name, state and position of the apparatus acting as the printer are displayed on the image plane (step S63). Then, the flow waits for the selection by the user.

When "automatic selection" is selected by the user (step S64), the apparatus which is closest to the position of the user's personal computer 120 and can perform the printing is selected, and the selected apparatus is displayed reversely (step S65). Then, when the user selects the objective apparatus from an apparatus list, the selected apparatus is displayed reversely (step S66).

Figure 15B:
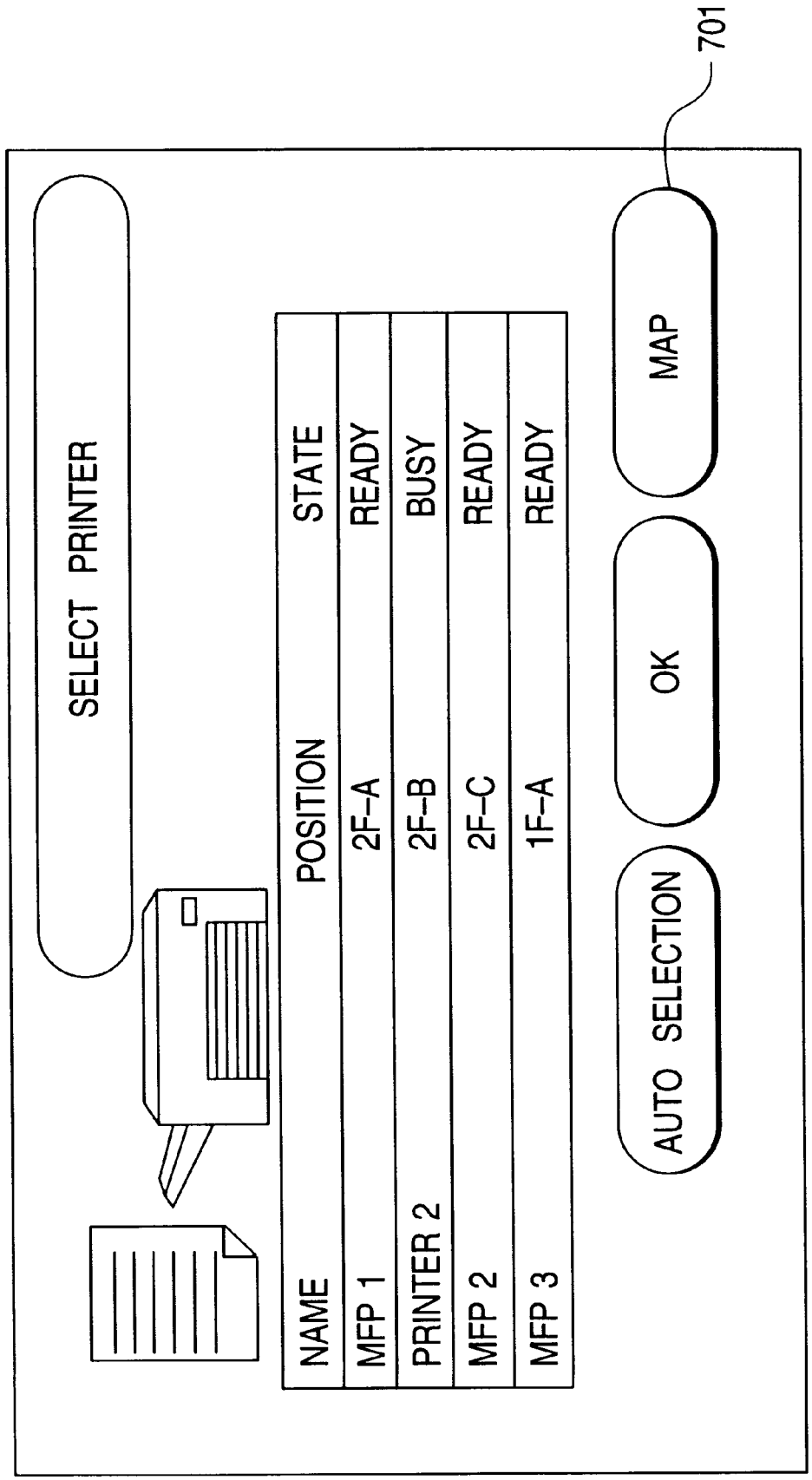
Figure 16:
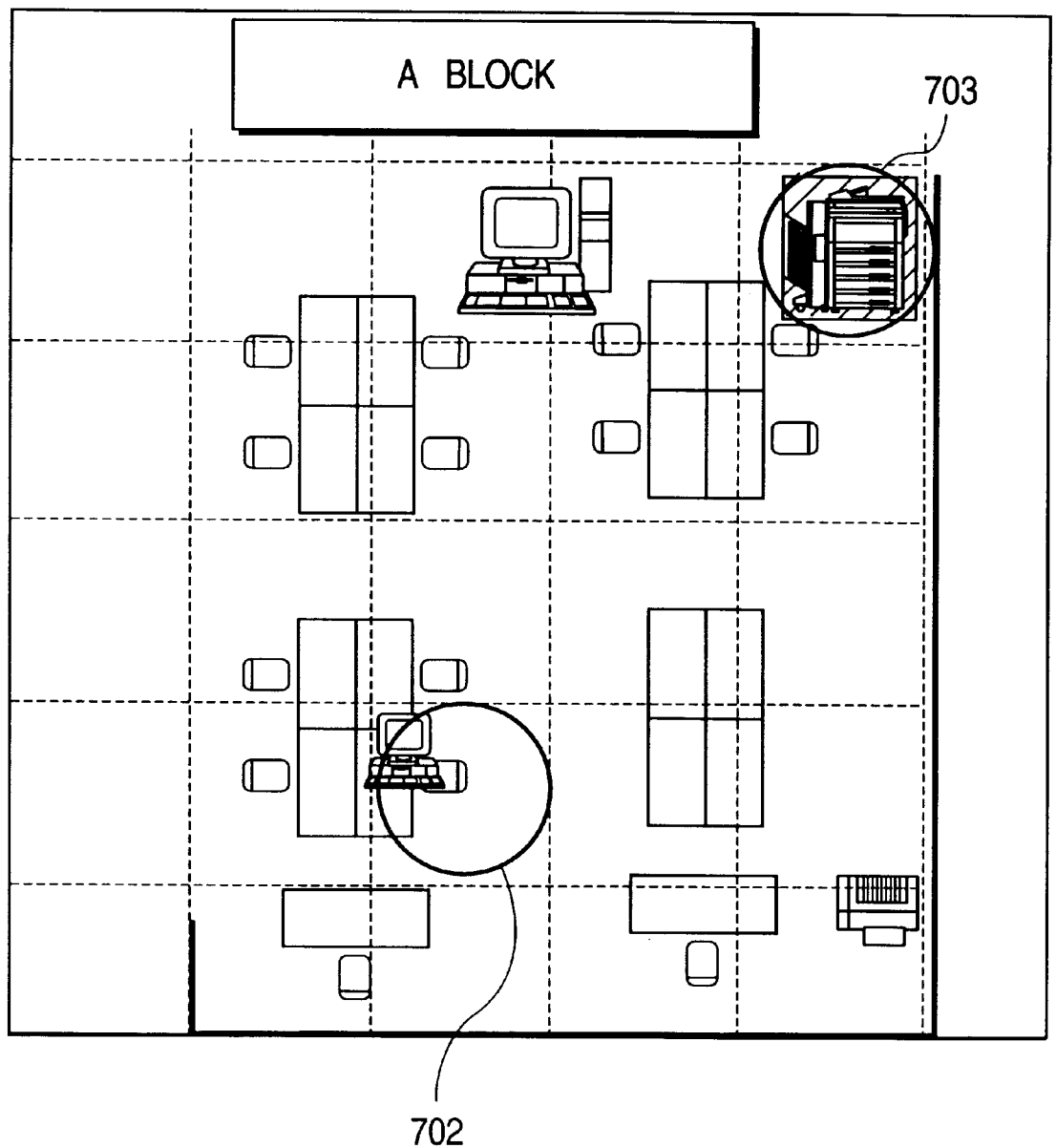
FIG. 16 is a view showing a layout map display image plane of the personal computer and the selection-target apparatuses.

Further, when a button "MAP" 701 shown in FIG. 15B is depressed to display the physical setting position of the selected apparatus (step S67), a block layout drawing is displayed as shown in FIG. 16 (step S68). In this case, marks 702 and 703 are also displayed respectively to indicate the position of the user and the position of the selected and used apparatus. Thus, the physical position of the apparatus can be identified, so that the user can easily capture or obtain outputted results.

In the above-described embodiment, the example for selecting the output apparatus was explained. However, the operation is similarly performed in case of selecting the input apparatus, e.g., the scanner.

Further, in the above-described embodiment, the examples that the multi-functional machine is moved and selected were explained. However, the present invention can be applied to a case where the other apparatus, e.g., the printer, the facsimile transmission/reception apparatus or the like, of which size is relatively small is moved or selected, in the following manner. That is, even if such the small-size apparatus does not have any caster at its leg portion, the present invention can be realized by mounting or providing a sensor (optical sensor) capable of discriminating the movement on a bottom surface of the apparatus. In the ordinary state that the apparatus is standing, any light is not incident on a light reception portion of the sensor. However, if the light is made incident on such the light reception portion when the apparatus is moved, an internal timer of the sensor can be initiated, whereby movement or no movement can be judged based on a time counted by the timer.

Furthermore, by enlarging the console panel, the layout drawing can be displayed such that the user can easily recognize or find even the small-size apparatus. In a case where the console panel of the console and display unit can not be enlarged, it may be applied the operation that the coordinates on the layout drawing can be inputted by identifying the physical position of the apparatus at the server machine. Thus, even if the user selects the small-size apparatus, the physical position thereof can be easily identified.

As described above, in the present embodiment, since the name, state and physical position information of each apparatus in the network environment are initially set at the time of introducing such the apparatus and then the setting information is used, the user can easily grasp or understand the information input/output apparatus when he selects it. Therefore, it can be prevented that the user unnecessarily selects the apparatus which is distant from the user's position. Further, even if the apparatus is moved due to the change in layout, since the apparatus itself automatically displays the message, the user can set the physical position information of such the apparatus without forgetting to do so. Such the information is useful to manage the system which is composed of the plural apparatuses.

Furthermore, according to the above-described embodiment, since the movement of the apparatus is automatically detected and displayed, when moving the apparatus, the user can surely change the physical position information of the used apparatus without forgetting to do so. Furthermore, to change or not to change the information is performed on the basis of the operator's instruction, it can be prevented that the information is unnecessarily rewritten, e.g., when the apparatus is moved temporarily.

Furthermore, when the movement distance of the apparatus is equal to or longer than the predetermined distance, it is considered that the apparatus was moved, whereby the structure to recognize the movement can be simplified.

Furthermore, when the user selects the predetermined apparatus from among the plural information input/output apparatuses, since the kind as well as the physical position of the apparatus is graphically displayed, the user can accurately confirm the objective apparatus on the image plane. Therefore, it can be prevented that the user unnecessarily selects the apparatus which is distant from the user's position.

Furthermore, when the user causes the personal computer to display the layout drawing, since the setting position of this personal computer is displayed such that the position can be discriminated, the user can easily grasp or understand spatial layout relation between the personal computer being used by him and each apparatus.

When the layout drawing information is set, an obstacle or the like to movement of the user himself may be set such that the apparatus can be selected more appropriately. Further, when the apparatus was moved, an amount of such the movement may be calculated to automatically set the calculated amount.

The present invention can be applied to the system constructed by the plural equipments (e.g., host computer, interface equipment, reader, printer and the like) or can be also applied to the apparatus comprising the single equipment (e.g., copy machine, facsimile machine).

The invention employed by a method wherein program codes of a software to realize the functions of the above-described embodiment are supplied to a computer in an apparatus or a system connected to various devices so as to make the devices operative in order to realize the functions of the above-described embodiment and the various devices are operated in accordance with the programs stored in the computer (CPU or MPU) of the system or apparatus is also included in the scope of the present invention.

In such the case, the program codes themselves of the software realize the functions of the above-described embodiment and the program codes themselves and means for supplying the program codes to the computer, e.g., a storage medium in which the program codes have been stored, construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like can be used.

Also, even in not only a case where the functions of the above-described embodiment are realized by executing the supplied program codes by the computer but also a case where the functions of the above-described embodiment are realized in cooperation with the OS (operating system) by which the program codes operate in the computer or another application software or the like, such the program codes are of course included in the scope of the present invention.

Further, of course, the present invention also includes a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiment are realized by the processes.

The present invention has been described in connection with the above preferred embodiment. However, the present invention is not limited only to the above-described embodiment, but various modifications are possible without departing from the scope of the appended claims.

What is claimed is:

1. A data processing apparatus connected to a network, said apparatus comprising:
    an input unit, arranged to input layout information of an area in which said apparatus is disposed, the layout information being inputted from a management server for managing a layout of the network, and the management server being connected to the network and separated from said apparatus;
    a display unit, arranged to display the layout information, inputted by said input unit;
    a designation unit, arranged to designate a physical setting position of said apparatus as a designated physical setting position, based on the layout information displayed by said display unit;
    a storage unit, arranged to store the designated physical setting position, in correlation with discrimination information of said apparatus; and
    a transmitter, arranged to transmit the designated physical setting position to the management server to which said input unit inputted the layer information.

2. An apparatus according to claim 1, wherein said display unit graphically displays the layout, and said designation unit designates the physical setting position on the layout graphically displayed by said display unit.

3. An apparatus according to claim 1, wherein said designation unit performs a designation from said apparatus disposed in an area of the layout information.

4. An apparatus according to claim 1, further comprising a detector, arranged to detect a change of the physical setting position,
    wherein said storage unit changes stored contents thereof in a case where said detector detects a change of the physical setting position.

5. An apparatus according to claim 1, further comprising:
    a discrimination unit, arranged to discriminate a selection request of said apparatus; and
    a controller for controlling said display unit to display the layout information representing the physical setting position of said apparatus according to the selection request discriminated by said discrimination unit.

6. A data processing apparatus comprising:
    a storage unit, arranged to store setting position information indicating a physical setting position of a terminal connected to a network;
    a detector, arranged to detect a change of the physical setting position of the terminal corresponding to the setting position information stored in said storage unit, based on a movement of the terminal itself;
    an inquiry unit, arranged to inquire of an operator whether or not the setting position information stored in said storage unit is to be rewritten, in a case where said detector detects a change of the physical setting position of the terminal; and
    a controller, arranged to rewrite the setting position information in a case where it is instructed, by the operator, to rewrite the setting position information in response to an inquiry by said inquiry unit.

7. An apparatus according to claim 6, wherein said detector determines, in case where the terminal is moved by a distance equal to or greater than a predetermined distance, that the physical setting position of the terminal was changed.

8. An apparatus according to claim 6, further comprising a display unit, arranged to display layout information, representing the physical setting position of the terminal,
    wherein said controller rewrites the setting position information based on the layout information displayed by said display unit.

9. A method for setting position information of an apparatus connected to a network, said method comprising:
    an input step of inputting layout information of an area in which said apparatus is disposed, the layout information being inputted from a management server for managing a layout of the network, and the management server being connected to the network and separated from the apparatus;
    a display step of displaying the layout information, inputted in said input step, on a display;
    a designation step of designating a physical setting position of said apparatus as a designated physical setting position, based on the layout information displayed in said display step;
    a storage step of storing the designated physical setting position, in correlation with discrimination information of said apparatus; and
    a transmission step of transmitting the designated physical setting position to the management server to which the layout information is inputted in said input step.

10. A method for setting position information of a terminal connected through a network, said method comprising:
    a storage step of storing setting position information, indicating a physical setting position of the terminal connected to the network, into a storage apparatus;
    a detection step of detecting a change of the physical setting position of the terminal corresponding to the setting position information stored in said storage steps based on a movement of the terminal itself;
    an inquiry step of inquiring of an operator whether or not the setting position information stored in said storage step is to be rewritten, in a case where a change of the physical setting position of the terminal is detected in said detection step; and
    a control step of rewriting the setting position information in a case where it is instructed, by the operator, to rewrite the setting position information in response to an inquiry in said inquiry step.

11. A computer-readable storage medium storing a program for executing a method for setting position information of an apparatus connected to a network, the program comprising:
    code for inputting layout information of an area in which said apparatus is disposed, the layout information being input from a management server for managing a layout of the network, and the management server being connected to the network and separated from the apparatus;

code for displaying the inputted layout information on a display;

code for designating a physical setting position of the apparatus as a designated physical setting position, based on the displayed layout information;

code for storing the designated physical setting position in correlation with discrimination information of the terminal; and code for transmitting the designated physical setting position to the management server to which the layout information is inputted by the code for inputting.

12. A computer-readable storage medium storing a program for executing a method for setting position information of a terminal connected to a network, the program comprising:

code for detecting a change of a physical setting position of the terminal corresponding to setting position information previously stored in a storage apparatus, based on a movement of the terminal itself;

code for inquiring of an operator whether or not the stored setting position information of the terminal, for which a change of the physical setting position is detected, is to be rewritten; and code for rewriting the setting position information in the storage apparatus, in a case where it is instructed, by the operator, to rewrite the setting position information in response to an inquiry by the code for inquiring.

13. An information processing apparatus comprising:

a connector, arranged to connect said apparatus to a plurality of terminals through a network;

a display unit, arranged to graphically display a layout representing a setting position on the network of each of the plurality of terminals;

an input unit, arranged to input a predetermined condition indicating a function for using one of the plurality of terminals; and a controller, arranged to control said display unit to discriminate the one terminal corresponding to the predetermined condition input by said input unit, wherein said controller selects, among the plurality of terminals, at least one terminal corresponding to the predetermined condition input by said input unit, and controls said display unit to discriminate the selected terminal on the layout.

14. An apparatus according to claim 13, wherein said controller controls said display unit to discriminate a relation between a position of the one terminal and a position of said information processing apparatus.

15. An apparatus according to claim 13, wherein said input unit inputs a kind of terminal as the predetermined condition.

16. An apparatus according to claim 13, wherein said display unit displays a status of the one terminal.

17. An apparatus according to claim 13, wherein said display unit displays a name for designating the one terminal.

18. A method of controlling an apparatus connected to a plurality of terminals through a network, said method comprising the steps of:

graphically displaying a layout representing a setting position on the network of each of the plurality of terminals;

inputting a predetermined condition indicating a function for using one of the plurality of terminals; and controlling said displaying step to discriminate the one terminal corresponding to the predetermined condition input in said inputting step, wherein said controlling step selects, among the plurality of terminals, at least one terminal corresponding to the predetermined condition inputted in said inputting step, and controls said displaying step to discriminate the selected terminal on the layout.

19. A computer-readable storage medium storing a program for executing a method of controlling an apparatus connected to a plurality of terminals through a network, the program comprising:

program code for a display step of graphically displaying a layout representing a setting position on the network of each of the plurality of terminals;

program code for an input step of inputting a predetermined condition indicating a function for using one of the plurality of terminals; and program code for a control step of controlling the display step to discriminate the one terminal corresponding to the predetermined condition inputted in the input step, wherein the control step selects, among the plurality of terminals, at least one terminal corresponding to the predetermined condition input in the input step, and controls the display step to discriminate the selected terminal on the layout.

* * * * *

UNITED STATES PATENT AND TRADEMARK OFFICE
CERTIFICATE OF CORRECTION

PATENT NO. : 6,181,341 B1　　　　　　　　　　　　　　　　　　　　　Page 1 of 1
DATED : January 30, 2001
INVENTOR(S) : Tatsuo Shinagawa It is certified that error appears in the above-identified patent and that said Letters Patent is hereby corrected as shown below:

Abstract, item [57],
Line 4, "comprises" should read -- comprised of --.

Column 1,
Line 11, "it has become" should read -- there have developed --; and "that" should read -- in which --.
Line 23, "studded" should read -- connected --.
Line 37, "such the information can not" should read -- such information cannot --.
Line 46, "been" should be deleted.
Line 55, "been" should be deleted.

Column 6,
Line 39, "$X_0, Y_1, X_2, X_3$ and $X_4$." should read -- $X_0, X_1, X_2, X_3,$ and $X_4$. --.

Column 9,
Line 10, "apparats" should read -- apparatus --.

Column 12,
Line 49, "steps" should read -- step, --.

Signed and Sealed this

Thirteenth Day of November, 2001

Attest:

NICHOLAS P. GODICI
*Attesting Officer*　　　*Acting Director of the United States Patent and Trademark Office*